(12) United States Patent
Afrouzi et al.

(10) Patent No.: US 10,795,377 B2
(45) Date of Patent: Oct. 6, 2020

(54) METHOD FOR AUTONOMOUSLY CONTROLLING SPEED OF COMPONENTS AND FUNCTIONS OF A ROBOT

(71) Applicant: AI Incorporated, Toronto (CA)

(72) Inventors: Ali Ebrahimi Afrouzi, Toronto (CA); Masoud Nasiri, Toronto (CA); Scott McDonald, Toronto (CA)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 16/239,410

(22) Filed: Jan. 3, 2019

(65) Prior Publication Data

US 2019/0204851 A1 Jul. 4, 2019

Related U.S. Application Data

(60) Provisional application No. 62/735,137, filed on Sep. 23, 2018, provisional application No. 62/702,148, filed on Jul. 23, 2018, provisional application No. 62/699,101, filed on Jul. 17, 2018, provisional application No. 62/617,687, filed on Jan. 16, 2018, provisional application No. 62/617,685, filed on Jan. 16, 2018, provisional application No. 62/617,412,
(Continued)

(51) Int. Cl.
| | |
|---|---|
| *A47L 9/04* | (2006.01) |
| *G05D 1/02* | (2020.01) |
| *A47L 9/28* | (2006.01) |
| *A47L 11/24* | (2006.01) |
| *B25J 9/16* | (2006.01) |
| *A47L 11/40* | (2006.01) |
| *B25J 11/00* | (2006.01) |

(52) U.S. Cl.
CPC .......... *G05D 1/0274* (2013.01); *A47L 9/0405* (2013.01); *A47L 9/0488* (2013.01); *A47L 9/2826* (2013.01); *A47L 9/2831* (2013.01); *A47L 9/2847* (2013.01); *A47L 9/2852* (2013.01); *A47L 11/24* (2013.01); *A47L 11/4011* (2013.01); *B25J 9/1633* (2013.01); *B25J 9/1664* (2013.01); *B25J 11/0085* (2013.01); *A47L 2201/04* (2013.01); *A47L 2201/06* (2013.01); *G05D 2201/0215* (2013.01)

(58) Field of Classification Search
USPC ................................................ 700/245–264
See application file for complete search history.

(56) References Cited

U.S. PATENT DOCUMENTS

| | | | | |
|---|---|---|---|---|
| 9,725,013 | B2 * | 8/2017 | Romanov | ............... B60L 50/52 |
| 2005/0010331 | A1 * | 1/2005 | Taylor | .................. G05D 1/0219 |
| | | | | 700/245 |

(Continued)

*Primary Examiner* — Jonathan L Sample

(57) ABSTRACT

Provided is a robot, including: a first actuator; a first sensor; one or more processors communicatively coupled to the first actuator and to the first sensor; and memory storing instructions that when executed by at least some of the one or more processors effectuate operations comprising: determining a first location of the robot in a working environment; obtaining, with the first sensor, first data indicative of an environmental characteristic of the first location; and adjusting a first operational parameter of the first actuator based on the sensed first data, wherein the adjusting is configured to cause the first operational parameter to be in a first adjusted state while the robot is at the first location.

30 Claims, 18 Drawing Sheets

Related U.S. Application Data filed on Jan. 15, 2018, provisional application No. 62/617,022, filed on Jan. 12, 2018, provisional application No. 62/616,187, filed on Jan. 11, 2018, provisional application No. 62/615,582, filed on Jan. 10, 2018, provisional application No. 62/613,150, filed on Jan. 3, 2018.

(56) References Cited

U.S. PATENT DOCUMENTS

| | | | |
|---|---|---|---|
| 2005/0166354 A1* | 8/2005 | Uehigashi | A47L 9/2852 15/319 |
| 2005/0171644 A1* | 8/2005 | Tani | G05D 1/0274 700/253 |
| 2005/0273967 A1* | 12/2005 | Taylor | G05D 1/0227 15/319 |
| 2007/0234492 A1* | 10/2007 | Svendsen | G05D 1/0225 15/21.1 |
| 2008/0179156 A1 | 7/2008 | Byun | |
| 2009/0133720 A1* | 5/2009 | Van Den Bogert | A47L 9/04 134/18 |
| 2014/0214205 A1* | 7/2014 | Kwon | A47L 11/4011 700/258 |
| 2015/0223653 A1* | 8/2015 | Kim | A47L 11/4044 15/384 |
| 2016/0143496 A1* | 5/2016 | Penner | A47L 9/0472 15/383 |
| 2016/0157692 A1* | 6/2016 | Maoro | A46B 9/02 15/300.1 |
| 2016/0166127 A1* | 6/2016 | Lewis | A47L 9/0477 15/49.1 |
| 2016/0235270 A1* | 8/2016 | Santini | A47L 9/0411 |
| 2016/0271795 A1* | 9/2016 | Vicenti | G05D 1/0274 |
| 2017/0235312 A1* | 8/2017 | Yoshino | A47L 11/4008 700/258 |
| 2018/0050634 A1* | 2/2018 | White | A47L 9/2805 |
| 2018/0070787 A1* | 3/2018 | Gordon | A47L 9/2857 |
| 2018/0071918 A1* | 3/2018 | Angle | H04W 4/029 |
| 2018/0074508 A1* | 3/2018 | Kleiner | A47L 9/0488 |
| 2018/0199780 A1 | 7/2018 | Landry et al. | |
| 2018/0235425 A1 | 8/2018 | Ding et al. | |
| 2018/0263454 A1 | 9/2018 | Landry et al. | |
| 2018/0284786 A1* | 10/2018 | Moshkina-Martinson | G05D 1/024 |
| 2018/0304472 A1 | 10/2018 | Angle et al. | |
| 2018/0325252 A1 | 11/2018 | Hopke et al. | |
| 2018/0344114 A1 | 12/2018 | Scholten et al. | |
| 2018/0353250 A1 | 12/2018 | Fournier et al. | |
| 2019/0018420 A1* | 1/2019 | Yee | A47L 9/281 |
| 2019/0167059 A1* | 6/2019 | Brown | G05D 1/0033 |

\* cited by examiner

FIG. 3

METHOD FOR AUTONOMOUSLY CONTROLLING SPEED OF COMPONENTS AND FUNCTIONS OF A ROBOT

CROSS-REFERENCE TO RELATED APPLICATIONS

This application claims the benefit of Provisional Patent Application Nos. 62/699,101 filed Jul. 17, 2018, 62/702,148 filed Jul. 23, 2018, 62/616,187, filed Jan. 11, 2018, 62/613,150 filed Jan. 3, 2018, 62/617,412 filed Jan. 15, 2018, 62/735,137 filed Sep. 23, 2018, 62/617,022 filed Jan. 12, 2018, 62/615,582 filed Jan. 10, 2018, 62/617,687 filed Jan. 16, 2018, and 62/617,685 filed Jan. 16, 2018, each of which is hereby incorporated by reference.

In this patent, certain U.S. patents, U.S. patent applications, or other materials (e.g., articles) have been incorporated by reference. Specifically, U.S. patent application Ser. Nos. 16/203,385, 16/024,263, 15/924,176, 15/647,472, 15/272,752, 15/949,708, 16/048,179, 16/048,185, 16/163,541, 16/163,562, 16/163,508, 16/185,000, 62/681,965, 62/614,449, 16/109,617, 16/051,328, 15/449,660, 16/041,286, 15/406,890, 14/673,633, 16/163,530, 62/746,688, 62/740,573, 62/740,580, 15/955,480, 15/425,130, 15/955,344, 14/817,952, 62/666,266, and 62/590,205, 15/981,643, 15/986,670, and 15/048,827 are hereby incorporated by reference in their entirety. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

This disclosure relates to methods for autonomously and dynamically adjusting the speed of components of a robotic cleaning device while performing work based on sensory input of the environment. More particularly, the disclosure relates to a machine learning approach for autonomously and dynamically adjusting the speed of a main brush of a robotic cleaning device based on environmental characteristics predicted from real-time sensory input.

BACKGROUND

Autonomous or semi-autonomous robotic devices are increasingly used within consumer homes and commercial establishments. In several instances, autonomous or semi-autonomous robotic devices are desirable for the convenience they provide to users. For example, robotic cleaning devices can perform weekly tasks such as vacuuming, sweeping, mopping, and dusting—relieving users of these duties. However, in some cases, tasks executed by robotic cleaning devices are not performed optimally for all areas within an environment. For example, an environment that includes an area with hard wood floor and an area with carpet may require different robotic cleaning device suction or wheel speed settings for optimal cleaning as dirt and debris is harder to lift from carpet and harder to drive across. Methods for autonomously and dynamically adjusting the speed of components (e.g., main brush, impeller, peripheral brush, wheels, etc.) according to the needs of different locations within an environment are, therefore, important for optimal (e.g., fully optimal or closer to optimal than with traditional techniques) performance of a robotic device.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects relate to a robot, including: a first actuator; a first sensor; one or more processors communicatively coupled to the first actuator and to the first sensor; and memory storing instructions that when executed by at least some of the one or more processors effectuate operations comprising: determining a first location of the robot in a working environment; obtaining, with the first sensor, first data indicative of an environmental characteristic of the first location; and adjusting a first operational parameter of the first actuator based on the sensed first data, wherein the adjusting is configured to cause the first operational parameter to be in a first adjusted state while the robot is at the first location.

BRIEF DESCRIPTION OF THE FIGURES

FIG. 3 illustrates values associated with floor type for each grid cell in the exemplary grid layout map of the work environment according to some embodiments.

DETAILED DESCRIPTION OF SOME EMBODIMENTS

Figure 1:
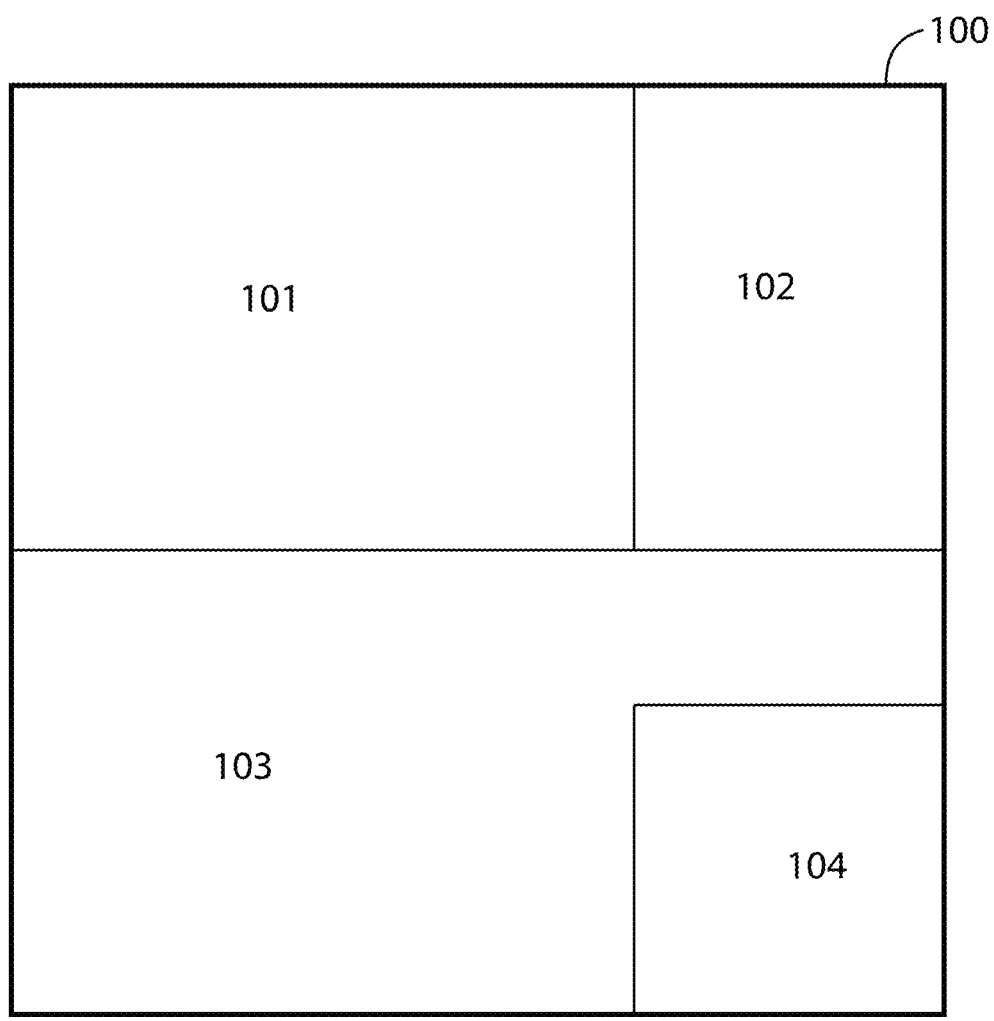
FIG. 1 illustrates an example of a work environment according to some embodiments.

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments are an autonomous robotic cleaning device with one or more processors and one or more environmental sensors (e.g., sensors that sense attributes or can observe or provide data from which inferences can be made about characteristics of an environment, such as those of a floor, a wall, or a surface of an obstacle). In some embodiments, the environmental sensor is communicatively coupled to the processor of the robotic cleaning device and the processor of the robotic cleaning device processes the sensor data (a term which is used broadly and may refer to information based on sensed or observed or inferred data at various stages of a processing pipeline). In some embodiments, the sensor includes its own processor for processing the sensor data. Examples of sensors include, but are not limited to (which is not to suggest that any other described component of the robotic cleaning device is required in all embodiments), floor sensors, debris sensors, obstacle sensors, cliff sensors, acoustic sensors, cameras, optical sensors, distance sensors, motion sensors, tactile sensors, electrical current sensors, and the like. Sensors may sense various attributes of one or more of these features of an environment, e.g., particulate density, rolling resistance experienced by robot wheels, hardness, location, carpet depth, sliding friction experienced by robot brushes, hardness, color, acoustic reflectivity, optical reflectivity, planarity, acoustic response of a surface to a brush, and the like. In some embodiments, the sensor takes readings of the environment (e.g., periodically, like more often than once every 5 seconds, every second, every 500 ms, every 100 ms, or the like or randomly as determined by an algorithm) and the processor obtains the sensor data. In some embodiments, the sensed data is associated with location data of the robot indicating the location of the robot at the time the sensor data was obtained. In some embodiments, the processor infers environmental characteristics from the sensory data (e.g., classifying the local environment of the sensed location within some threshold distance or over some polygon like a rectangle as being with a type of environment within a ontology, like a hierarchical ontology). In some embodiments, the processor infers characteristics of the environment in real-time (e.g., during a cleaning or mapping session, for example, with 10 seconds of sensing, within 1 second of sensing, or faster) from real-time sensory data. In some embodiments, the processor adjusts various operating parameters of actuators, like speed, torque, duty cycle, frequency, slew rate, flow rate, pressure drop, temperature, brush height above the floor, or second or third order time derivatives of the same. For instance, some embodiments adjust the speed of components (e.g., main brush, peripheral brush, wheel, impeller, etc.) based on the environmental characteristics inferred (in some cases in real-time according to the preceding sliding windows of time). In some embodiments, the processor activates or deactivates (or modulates intensity of) functions (e.g., vacuuming, mopping, UV, etc.) based on the environmental characteristics inferred (a term used broadly and that includes classification and scoring). In other instances, the processor adjusts a cleaning path, operational schedule (e.g., time when various designated areas are worked upon, such as when cleaned), and the like based on sensory data. Examples of environmental characteristics include floor type, obstacle density, room type, level of debris accumulation, level of user activity, time of user activity, etc.

In some embodiments, the processor of the robotic cleaning device marks inferred environmental characteristics of different locations of the environment within a map of the environment based on observations from all or a portion of current and/or historical sensory data. In some embodiments, the processor modifies the environmental characteristics of different locations within the map of the environment as new sensory data is collected and aggregated with sensory data previously collected or based on actions of the robotic cleaning device (e.g., cleaning history). For example, in some embodiments, the processor determines the probability of a location having different levels of debris accumulation (e.g., the probability of a particular location having low, medium and high debris accumulation) based on the sensory data. If the location has a high probability of having a high level of debris accumulation and was just cleaned, the processor reduces the probability of the location having a high level of debris accumulation and increases the probability of having a low level of debris accumulation. Based on sensed data, some embodiments may classify or score different areas of a working environment according to various dimensions, e.g., classifying by floor type in a hierarchical floor type ontology or according to a dirt-accumulation score by debris density or rate of accumulation.

In some embodiments, the processor of the robotic cleaning device creates a map of the environment using measurements collected by sensory devices as it navigates throughout the environment. Examples of methods for creating a map of the environment are described in U.S. patent application Ser. Nos. 16/048,179, 16/048,185, 16/163,541, 16/163,562, 16/163,508, 16/185,000, 62/681,965, and 62/614,449, the entire contents of which are hereby incorporated by reference. In some embodiments, a pre-constructed map is provided and stored in the memory of the robotic cleaning device. In some embodiments, the map of the environment is a grid map wherein the map is divided into cells (e.g., unit tiles in a regular or irregular tiling), each cell representing a different location within the environment. In some embodiments, the processor divides the map to form a grid map. In some embodiments, the map is a Cartesian coordinate map while in other embodiments the map is of another type, such as a polar, homogenous, or spherical coordinate map. In some embodiments, the environmental sensor collects data as the robotic cleaning device navigates throughout the environment or operates within the environment as the robotic device maps the environment. In some embodiments, the processor associates each or a portion of the environmental sensor readings with the particular cell of the grid map within which the robotic cleaning device was located when the particular sensor readings were taken. In some embodiments, the processor associates environmental characteristics directly measured or inferred from sensor readings with the particular cell within which the robotic cleaning device was located when the particular sensor readings were taken. In some embodiments, the processor associates environmental sensor data obtained from a fixed sensing device and/or another robotic cleaning device with cells of the grid map. In some embodiments, the robotic cleaning device continues to cover the surface of the environment until data from the environmental sensor is collected for each or a select number of cells of the grid map. In some embodiments, the environmental characteristics (predicted or measured or inferred) associated with cells of the grid map include, but are not limited to (which is not to suggest that any other described characteristic is required in all embodiments), a floor type, a room type, a type of floor transition, a level of debris accumulation, a type of debris, a size of debris, a level of user activity, a time of user activity, etc. In some embodiments, the environmental characteristics associated with cells of the grid map are based on sensor data collected during multiple working sessions wherein characteristics are assigned a probability of being true based on observations of the environment over time.

In some embodiments, the processor associates (e.g., in memory of the robot) information such as date, time, and location with each sensor reading or other environmental characteristic based thereon. In some embodiments, the processor associates information to only a portion of the sensor readings. In some embodiments, the processor stores all or a portion of the environmental sensor data and all or a portion of any other data associated with the environmental sensor data in a memory of the robotic cleaning device. In some embodiments, the processor uses the aggregated stored data for optimizing (a term which is used herein to refer to improving relative to previous configurations and does not require a global optimum) cleaning of the environment by adjusting settings of components such that they are ideal (or otherwise improved) for the particular environmental characteristics of the location being serviced or to be serviced.

In some embodiments, the processor of the robotic cleaning device generates a new grid map with new characteristics associated with each or a portion of the cells of the grid map at each work session. For instance, each unit tile may have associated therewith a plurality of environmental characteristics, like classifications in an ontology or scores in various dimensions like those discussed above. In some embodiments, the processor compiles the map generated at the end of a work session with an aggregate map based on a combination of maps generated during each or a portion of prior work sessions. In some embodiments, the processor directly integrates data collected during a work session into the aggregate map either after the work session or in real-time as data is collected. In some embodiments, the processor aggregates (e.g., consolidates a plurality of values into a single value based on the plurality of values) current sensor data collected with all or a portion of sensor data previously collected during prior working sessions of the robotic cleaning device. In some embodiments, the processor also aggregates all or a portion of sensor data collected by sensors of other robotic cleaning devices or fixed sensing devices monitoring the environment. In some embodiments, processors of robotic devices or fixed sensing devices authenticate one another prior to establishing a connection to share intelligence and collaborate. Examples of methods for robotic devices to establish a connection and collaborate with another are described in U.S. patent application Ser. Nos. 15/981,643, 15/986,670, and 15/048,827, the entire contents of which are hereby incorporated by reference. In some embodiments, robotic devices collaborate to build a map of the environment using methods such as those described in U.S. patent application Ser. No. 16/185,000, the entire contents of which is hereby incorporated by reference.

In some embodiments, the processor (e.g., of a robot or a remote server system, either one of which (or a combination of which) may implement the various logical operations described herein) determines probabilities of environmental characteristics (e.g., an obstacle, a floor type, a type of floor transition, a room type, a level of debris accumulation, a type or size of debris, etc.) existing in a particular location of the environment based on current sensor data and sensor data collected during prior work sessions. For example, in some embodiments, the processor updates probabilities of different floor types existing in a particular location of the environment based on the currently inferred floor type of the particular location and the previously inferred floor types of the particular location during prior working sessions of the robotic cleaning device and/or of other robotic cleaning devices or fixed sensing devices monitoring the environment. In some embodiments, the processor updates the aggregate map after each work session. In some embodiments, the processor adjusts speed of components and/or activates/deactivates functions based on environmental characteristics with highest probability of existing in the particular location of the robotic cleaning device such that they are ideal for the environmental characteristics predicted. For example, based on aggregate sensory data there is an 85% probability that the type of floor in a particular location is hardwood, a 5% probability it is carpet, and a 10% probability it is tile. The processor adjusts the speed of components to ideal speed for hardwood flooring given the high probability of the location having hardwood flooring. Some embodiments may classify unit tiles into a flooring ontology, and entries in that ontology may be mapped in memory to various operational characteristics of actuators of the robot that are to be applied.

In some embodiments, the processor uses the aggregate map to predict areas with high risk of stalling, colliding with obstacles and/or becoming entangled with an obstruction. In some embodiments, the processor records the location of each such occurrence and marks the corresponding grid cell(s) in which the occurrence took place. For example, the processor uses aggregated obstacle sensor data collected over multiple work sessions to determine areas with high probability of collisions or aggregated electrical current sensor of a peripheral brush motor to determine areas with high probability of increased electrical current due to entanglement with an obstruction. In some embodiments, the processor causes the robot to avoid or reduce visitation to such areas.

In some embodiments, the processor uses the aggregate map to determine a navigational path within the environment, which in some cases, may include a coverage path in various areas (e.g., areas including collections of adjacent unit tiles, like rooms in a multi-room work environment). Various navigation paths may be implemented based on the environmental characteristics of different locations within the aggregate map. For example, the processor may generate a cleaning path that covers areas only requiring low impeller motor speed (e.g., areas with low debris accumulation, areas with hardwood floor, etc.) when individuals are detected as being or predicted to be present within the environment to reduce noise disturbances. In another example, the processor generates (e.g., forms a new instance or selects an extant instance) a cleaning path that covers areas with high probability of having high levels of debris accumulation, e.g., a cleaning path may be selected that covers a first area with a first historical rate of debris accumulation and does not cover a second area with a second, lower, historical rate of debris accumulation. An example of methods for generating a cleaning path according to the amount of debris accumulation in different areas of the environment is described in U.S. patent application Ser. No. 16/163,530, the entire contents of which is hereby incorporated by reference. In some embodiments, the processor determines a cleaning path using methods such as those described in U.S. patent application Ser. Nos. 16/041,286, 15/406,890, and 14/673,633, the entire contents of which are hereby incorporated by reference.

In some embodiments, the processor of the robotic cleaning device uses real-time environmental sensor data (or environmental characteristics inferred therefrom) or environmental sensor data aggregated from different working sessions or information from the aggregate map of the environment to dynamically adjust the speed of components and/or activate/deactivate functions of the robotic device during operation in an environment. For example, an electrical current sensor may be used to measure the amount of current drawn by a motor of a main brush in real-time. The processor may infer the type of floor based on the amount current drawn and in response adjusts the speed of components such that they are ideal for the particular floor type. For instance, if the current drawn by the motor of the main brush is high, the processor may infer that the robotic vacuum is on carpet, as more power is required to rotate the main brush at a particular speed on carpet as compared to hard flooring (e.g., wood or tile). In response to inferring carpet, the processor may increase the speed of the main brush and impeller (or increase applied torque without changing speed, or increase speed and torque) and reduces the speed of the wheels for a deeper cleaning. Some embodiments may raise or lower a brush in response to a similar inference, e.g., lowering a brush to achieve a deeper clean. In a similar manner, an electrical current sensor that measures the current drawn by a motor of a wheel may be used to predict the type of flooring, as carpet, for example, requires more current to be drawn by the motor to maintain a particular speed as compared to hard flooring. In some embodiments, the processor aggregates motor current measured during different working sessions and determines adjustments to speed of components using the aggregated data. In another example, a distance sensor takes distance measurements and the processor infers the type of flooring using the distance measurements. For instance, the processor infers type of flooring from distance measurements of a time-of-flight ("TOF") sensor positioned on, for example, the bottom surface of the robotic cleaning device as hard flooring, for example, has consistent distance measurements over time (to within a threshold) and carpet, for example, has more irregularity in readings due to the texture of carpet. In a further example, the processor uses sensor readings of an image sensor with at least one IR illuminator or any other structured light positioned on the bottom side of the robotic cleaning device to infer type of flooring. The processor observes the signals to infer type of flooring. For example, driving surfaces such as carpet produce more distorted and scattered signals as compared with hard flooring due to their texture. The processor may use this information to infer the type of flooring.

In some embodiments, the processor infers presence of users from sensory data of a motion sensor (e.g., while the robot is static, or with a sensor configured to reject signals from motion of the robot itself). In response to inferring the presence of users, the processor may reduce impeller speed to decrease noise disturbance. In some embodiments, the processor infers a level of debris accumulation from sensory data of an audio sensor. For example, the processor infers a particular level of debris accumulation based on the level of noise recorded. In response to observing high level of debris accumulation, the processor increases the impeller speed for stronger suction and reduces the wheel speeds to provide more time to collect the debris. In some embodiments, the processor infers level of debris accumulation using an IR transmitter and receiver positioned along the debris flow path, with a reduced density of signals indicating increased debris accumulation. In some embodiments, the processor infers level of debris accumulation using data captured by an imaging device positioned along the debris flow path. In some embodiments, the processor infers a level of obstacle density from sensory data of an obstacle sensor. For example, in response to inferring high level of obstacle density, the processor reduces the wheel speeds to avoid collisions. In some instances, the processor adjusts a frame rate (or speed) of an imaging device and/or a rate (or speed) of data collection of a sensor based on sensory data.

In some embodiments, the robotic device localizes itself within a map of the environment including environmental characteristics and autonomously adjusts speed of components or activates/deactivates functions based on the environmental characteristics of its current location. Examples of methods for localizing a robotic device are described in U.S. Patent Application Ser. Nos. 62/746,688, 62/740,573, 62/740,580, 15/955,480, 15/425,130, and 15/955,344, the entire contents of which are hereby incorporated by reference. In other embodiments, the processor infers environmental characteristics using other types of sensory data.

In some embodiments, the processor adjusts speed of components, selects actions of the robotic device, and adjusts settings of the robotic cleaning device, each in response to real-time or aggregated sensor data (or environmental characteristics inferred therefrom). For example, the processor may adjust the speed or torque of a main brush motor, an impeller motor, a peripheral brush motor or a wheel motor, activate or deactivate (or change luminosity or frequency of) ultraviolet (UV) treatment from a UV light configured to emit below a robot, steam and/or liquid mopping (e.g., modulating flow rate of soap or water), sweeping, or vacuuming (e.g., modulating pressure drop or flow rate), set a cleaning schedule, adjust a cleaning path, etc. in response to real-time or aggregated sensor data (or environmental characteristics inferred therefrom). In one instance, the processor of the robotic cleaning device may determine a cleaning path based on debris accumulation data of the aggregate map such that the cleaning path first covers areas with high likelihood of high levels of debris accumulation (relative to other areas of the work environment), then covers areas with high likelihood of low levels of debris accumulation. Or the processor may determine a cleaning path based on cleaning all areas having a first type of flooring before cleaning all areas having a second type of flooring. In another instance, the processor of the robotic cleaning device may determine the speed of an impeller motor based on most likely debris size or floor type marked in the aggregate map such that higher speeds are used in areas with high likelihood of large sized debris or carpet and lower speeds are used in areas with high likelihood of small sized debris or hard flooring. In another example, the processor of the robotic devices determines when to use UV treatment based on data indicating debris type of the aggregate map such that areas with high likelihood of having debris that can cause sanitary issues, such as food, receive UV or other type of specialized treatment.

In a further example, the processor identifies a user in a particular area of the environment using obstacle sensor data collected during a cleaning session. In response, the processor reduces the speed of the impeller motor when operating within the particular area or avoids the particular area to reduce noise disturbances to the user. In some embodiments, the processor controls operation of one or more peripheral brushes of the robotic cleaning device based on environmental characteristics inferred from sensory data. For example, the processor deactivates the one or more peripheral brushes passing over locations with high obstacle density to avoid entanglement with obstacles. In another example, the processor activates the one or more peripheral brushes passing over location with high level of debris accumulation. In some instances, the processor adjusts the speed of the one or more peripheral brushes according to the level of debris accumulation.

In some embodiments, the processor of the robotic cleaning device determines speed of components and actions of the robotic cleaning device at a location based on different environmental characteristics of the location within an environment. In some embodiments, the processor assigns certain environmental characteristics a higher weight (e.g., importance or confidence) when determining speed of components and actions of the robotic cleaning device.

In some embodiments, a graphical user interface (GUI) of an application (e.g., a native application or web application) of a communication device is used to modify, add, and/or delete information to the map of the environment. Examples of a communication device include, but are not limited to, a smartphone, computer, tablet, laptop, dedicated remote control, or any device that may communicate with and display data from the robotic cleaning device and receive inputs from a user. In some embodiments, input into the application of the communication device specifies or modifies environmental characteristics of different locations within the map of the environment. For example, floor type of locations, locations likely to have high and low levels of debris accumulation, locations likely to have a specific type or size of debris, locations with large obstacles, etc. are specified or modified using the application of the communication device. In other embodiments, input into the application of the communication device modifies, adds, and/or deletes perimeters, doorways, subareas, etc. of the map and/or cleaning path. Input into the application also chooses or modifies functions and settings of the robotic cleaning device such as cleaning mode (e.g. vacuuming, UV treatment, sweeping, mopping, etc.), cleaning schedule (e.g., day and time of cleaning, subarea to be cleaned, frequency of cleaning, etc.), order of coverage of subareas of the environment, impeller speed, main brush speed, wheel speed, peripheral brush speed, etc. Examples of scheduling methods are described in U.S. patent application Ser. Nos. 16/051,328 and 15/449, 660. An example of a GUI is described in U.S. patent application Ser. Nos. 15/272,752 and 15/949,708, the entire contents of which are hereby incorporated by reference. In some embodiments, the application of the communication device is paired with the robotic device using pairing methods such as those described in U.S. patent application Ser. No. 16/109,617, the entire contents of which are hereby incorporated by reference. In some cases, the user interface is an audio user interface of a smart speaker configured to implement similar logic through text-to-speech conversion and text classification, e.g., an audible utterance of "the kitchen is dirty" may cause embodiments to adjust debris accumulation scores for unit tiles in an area bearing the label "kitchen" in memory.

In some embodiments, the processor may use machine learning techniques to predict environmental characteristics using sensor data such that adjustments to speed of components of the robotic cleaning device can be made autonomously and in real-time to accommodate the current environment. Examples can include, but are not limited to, adjustments to the speed of the main brush, wheels, impeller and peripheral brush, activating/deactivating UV treatment, sweeping, steam or liquid mopping, and vacuuming, adjustments to cleaning path and cleaning schedule, etc. In some embodiments, the processor may use a classifier such as a convolutional neural network to classify real-time sensor data of a location within the environment into different environmental characteristic classes such as floor types, room types, levels of debris accumulation, debris types, debris sizes, and the like. In some embodiments, the processor dynamically and in real-time may adjust the speed of components of the robotic cleaning device based on the current environmental characteristics. Initially, the processor may train the classifier such that it can properly classify sensor data to different environmental characteristic classes. In some embodiments, training may be executed remotely and trained model parameter may be downloaded to the robot, which is not to suggest that any other operation herein must be performed on-robot. The processor may train the classifier by, for example, providing the classifier with training and target data that contains the correct environmental characteristic classifications of the sensor readings within the training data. For example, the processor may train the classifier to classify electric current sensor data of a main brush motor into different floor types. For instance, if the magnitude of the current drawn by the main brush motor is greater than a particular threshold for a predetermined amount of time, the classifier may classify the current sensor data to a carpet floor type class with some certainty. In other embodiments, the processor may classify sensor data based on the change in value of the sensor data over a predetermined amount of time or using entropy. For example, the processor may classify current sensor data of a main brush motor into a floor type class based on the change in electrical current over a predetermined amount of time or entropy value. In response to predicting an environmental characteristic, such as a floor type, the processor adjusts the speed of components (e.g., main brush and impeller) such that they are optimal for cleaning a location with the particular characteristics predicted, such as a predicted floor type. In some embodiments, adjusting the speed of components includes adjusting the speed of the motors driving the components. In some embodiments, the processor also chooses actions and/or settings of the robotic cleaning device in response to predicted (or measured or inferred) environmental characteristics of a location. In other examples, the processor inputs distance sensor data, audio sensor data, or optical sensor data into the classifier to classify the sensor data into different environmental characteristic classes (e.g., different floor type classes, room type classes, debris accumulation classes, debris type classes, etc.).

In some embodiments, the processor may use environmental sensor data from more than one type of sensor to improve predictions of environmental characteristics. Different types of sensors may include, but are not limited to, obstacle sensors, audio sensors, image sensors, TOF sensors, and/or current sensors. In some embodiments, the processor may provide the classifier with different types of sensor data and over time the weight of each type of sensor data in determining the predicted output is optimized by the classifier. For example, a processor of a robotic cleaning device may use both electrical current sensor data of a main brush motor and distance sensor data to predict floor type, thereby increasing the confidence in the predicted type of flooring.

In some embodiments, the processor may use thresholds, change in sensor data over time, distortion of sensor data, and/or entropy to predict environmental characteristics. In other instances, the processor uses other approaches for predicting (or measuring or inferring) environmental characteristics of locations within the environment. In some embodiments, to increase confidence in predictions (or measurements or inferences) of environmental characteristics in different locations of the environment, the processor uses a first set of environmental sensor data collected by a first environmental sensor to predict (or measure or infer) an environmental characteristic of a particular location a priori to using a second set of environmental sensor data collected by a second environmental sensor to predict an environmental characteristic of the particular location.

In some embodiments, the robotic cleaning device may initially operate with default settings for various components. For example, the wheels may initially operate at a predetermined speed, resulting in a predetermined speed of the robotic cleaning device. The main brush, peripheral brush, and impeller may also initially operate at a predetermined speed. The vacuum function may initially be activated while the mopping function is deactivated; however, if activated at a later time, the UV light may be activated by default. In some embodiments, default settings may be chosen during manufacturing based on what is suitable for most environments and/or users, or may be chosen by a user to suit a particular environment or their preferences. For example, setting a default slow speed for a peripheral brush generally conserves energy, slow speed for an impeller typically reduces sound, high speed for an impeller is usually more effective for carpeted flooring, etc.

In some instances, different default settings are set by a user using an application of a communication device (as described above) or an interface of the robotic cleaning device for different areas within an environment. For example, a user may prefer reduced impeller speed in bedrooms to reduce noise or high impeller speed in areas with soft floor types (e.g., carpet) or with high levels of dust and debris. As the robotic cleaning device navigates throughout the environment and sensors collect data, the processor may use the classifier to predict real-time environmental characteristics of the current location of the robotic device such as floor type, room type, debris accumulation, debris type, debris size, etc. In some embodiments, the processor assigns the environmental characteristics to the corresponding grid cell of the map of the environment. In some embodiments, the processor may adjust the default speed of components to best suit the environmental characteristics of the location predicted.

In some embodiments, the processor may adjust the speed of components by providing more or less power to the motor driving the components. For example, for carpeted flooring, the processor decreases the power supplied to the wheel motors to decrease the speed of the wheels and the robotic device and increases the power supplied to the main brush motor to rotate the brush at an increased speed for deeper cleaning.

In some embodiments, the processor records all or a portion of the real-time decisions corresponding to a particular location within the environment in a memory of the robotic device. In some embodiments, the processor marks all or a portion of the real-time decisions corresponding to a particular location within the grid map of the environment. For example, a processor marks the particular cell within the grid map corresponding with the location of the robotic device when increasing the speed of wheel motors because it predicts a particular floor type. In some embodiments, data may be saved in ASCII or other formats to occupy minimal memory space.

In some embodiments, the processor represents and distinguishes environmental characteristics using ordinal, cardinal, or nominal values, like numerical scores in various dimensions or descriptive categories that serve as nominal values. For example, the processor may denote different floor types, such as carpet, hardwood, and tile by numerical categories, such as 1, 2, and 3, respectively. In some embodiments, numerical or descriptive categories may be a range of values. For example, the processor may denote different levels of debris accumulation by categorical ranges such as 1-2, 2-3, and 3-4, wherein 1-2 denotes no debris accumulation to a low level of debris accumulation, 2-3 denotes a low to medium level of debris accumulation, and 3-4 denotes a medium to high level of debris accumulation. In some embodiments, the processor combines the numerical values with a 2D coordinate map of the environment forming a multi-dimensional coordinate map describing environmental characteristics of different locations within the environment, e.g., in a multi-channel bitmap. In some embodiments, the processor updates the grid map with new sensor data collected and/or information inferred from the new sensor data in real-time or after a work session. In some embodiments, the processor generates an aggregate map of all or a portion of the maps generated during each work session wherein the processor uses the environmental characteristics of the same cell predicted in each map to determine probabilities of each environmental characteristic existing in the particular cell.

In some embodiments, the processor uses environmental characteristics of the environment to infer additional information such as boundaries between rooms, transitions between different types of flooring, and types of room. For example, the processor may infer that a transition between different types of flooring exists in a location of the environment where two adjacent cells have different predicted type of flooring. In another example, the processor may infer with some degree of certainty that a collection of adjacent cells of the grid map with combined surface area below some threshold and all having hard flooring are associated with a particular environment, such as a bathroom as bathrooms are generally smaller than all other rooms in an environment and generally have hard flooring. In some embodiments, the processor labels areas or rooms of the environment based on such inferred information.

In some embodiments, the processor may adjust the speed of components of the robotic cleaning device continuously. For example, the processor continuously increases the power provided to the main brush motor as the robotic cleaning device transitions from operating on hardwood floor to carpeted floor. In other embodiments, the processor adjusts speed of components using discrete increments/decrements. For example, the processor may choose from 2, 3, or 4 different levels of speed during operation. In some embodiments, different discrete increments/decrements are used for different components.

In some embodiments, the processor commands the robotic cleaning device to completely clean one type of driving surface before moving on to another type of driving surface. In some embodiments, the processor commands the robotic cleaning device to prioritize cleaning cells with a particular environmental characteristic first (e.g., cell with high level of debris accumulation, cells with carpet flooring, cells with minimal obstacles, etc.). In some embodiments, the processor generates a cleaning path that connects cells with a particular environmental characteristic and the processor commands the robotic cleaning device to clean along the path. In some embodiments, the processor may command the robotic cleaning device to drive over cells with a particular environmental characteristic more slowly or quickly for a predetermined amount of time and/or at a predetermined frequency over a period of time. For example, a processor may command a robotic cleaning device to clean cells with a particular floor type, such as hardwood flooring, five times per week. In some embodiments, a user provides the above-mentioned commands and/or other commands to the robotic cleaning using a GUI of an application of a communication device paired with the robotic cleaning device (as described above) or an interface of the robotic vacuum. In some embodiments, the processor of the robotic cleaning device divides an area for cleaning into subareas and orders them for cleaning using methods such as those described in U.S. patent application Ser. Nos. 14/817,952, 62/666,266, and 62/590,205, the entire contents of which are hereby incorporated by reference.

In some embodiments, each wheel motor has an independent controller. In some embodiments, the processor coordinates the controllers of each wheel motor to maintain a desired heading.

In some embodiments, the speed of a motor driving a component may be monitored using an encoder that measures revolutions per minute (RPM). In some embodiments, the controller may obtain the speed in a feedback loop and adjusts the power supplied to the motor to adjust the speed as required. In some embodiments, electric pulses control the RPM of a motor wherein an increase in the number of electric pulses per second translates to a higher RPM. Depending on the physical attribute of the motor and considering each motor is slightly different, the number of electric pulses sent per second can result in a slightly higher or lower RPM than expected. In such instances, the RPM of the motor may be independently measured and the controller may receive feedback and adjust the number of electric pulses per second to achieve the desired RPM. In some embodiments, a PID controller may smoothen adjustments to the RPM of the motor. In some embodiments, the controller may measure the rate of increase or decrease of motor RPM based on the number of electric pulses per second to minimize overshooting and undershooting. In some embodiments, the processor or controller may use angular acceleration or the second derivative to further smoothen RPM adjustment of motors. Smooth adjustment in the speed of motors, such as a sweeper motor or wheel motor is generally desired as pulsed and unpredictable behavior or a sudden change (like an increase or halt in the motor speed) can add a lot of torque pressure to the motor and cause damage.

While these inventions have been described in terms of several embodiments, there are alterations, permutations, and equivalents, which fall within the scope of this invention. The inventions are not to be limited beyond that claimed to any type of sensing device or any type of approach or method used for perceiving, measuring or calculating readings, which is not to suggest that any other description herein is limiting. The devices and methods used herein are for illustrative purposes. It should also be noted that there are many alternative ways of implementing the methods and apparatuses of the present invention. Furthermore, unless explicitly stated, any method embodiments described herein are not constrained to a particular order or sequence.

FIG. 1 illustrates an example of a map of environment 100 with master bedroom 101, master bathroom 102, living room and dining room 103 and powder room 104. Robotic cleaning device 105 operates within environment 100, collecting environmental sensor data using environmental sensor 106, which in this case is a floor sensor.

Figure 2:
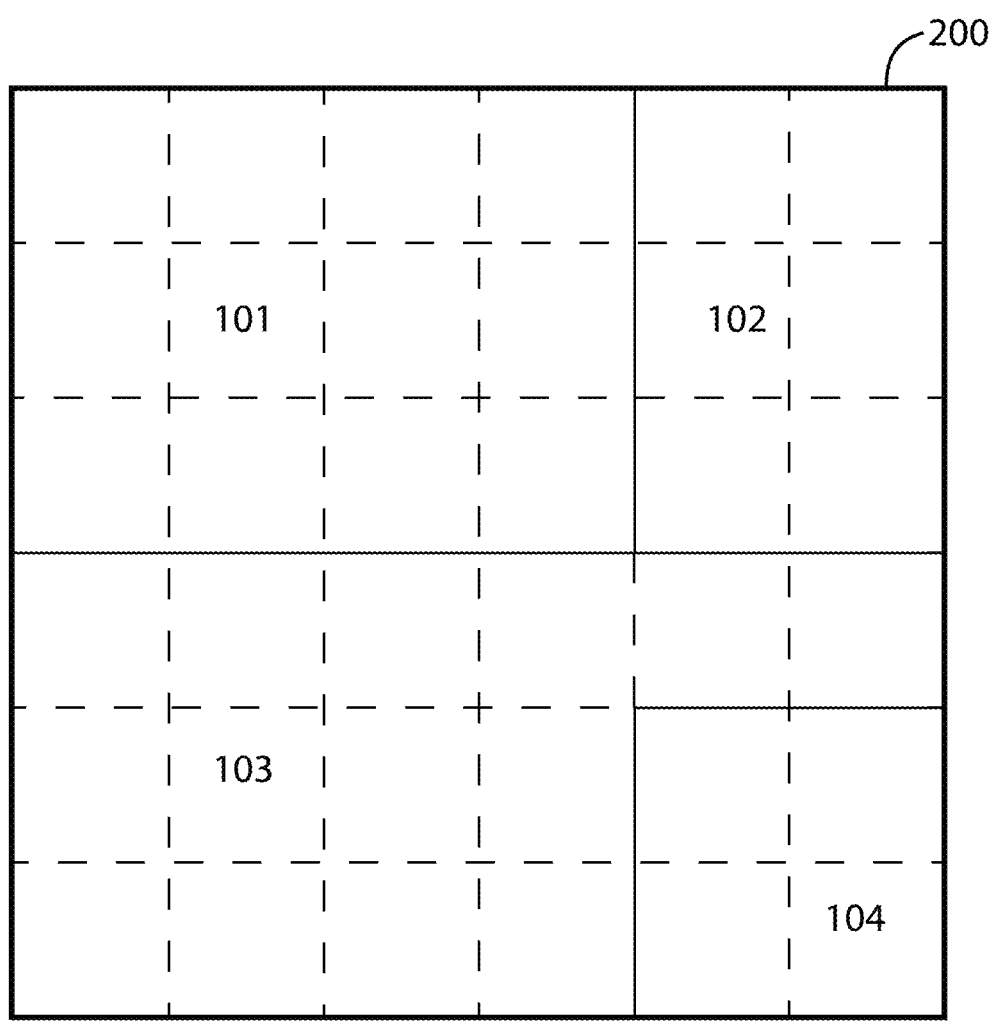
FIG. 2 illustrates an example of a grid layout map of the work environment according to some embodiments.

FIG. 2 illustrates an example of grid map 200 of environment 100. A processor of robotic cleaning device 105 (or a remote processor in a server system or at base station that receives data and offloads processing from the robot via a network) may infer floor types in different locations of environment 100 using floor sensor data in real-time.

Figure 3:
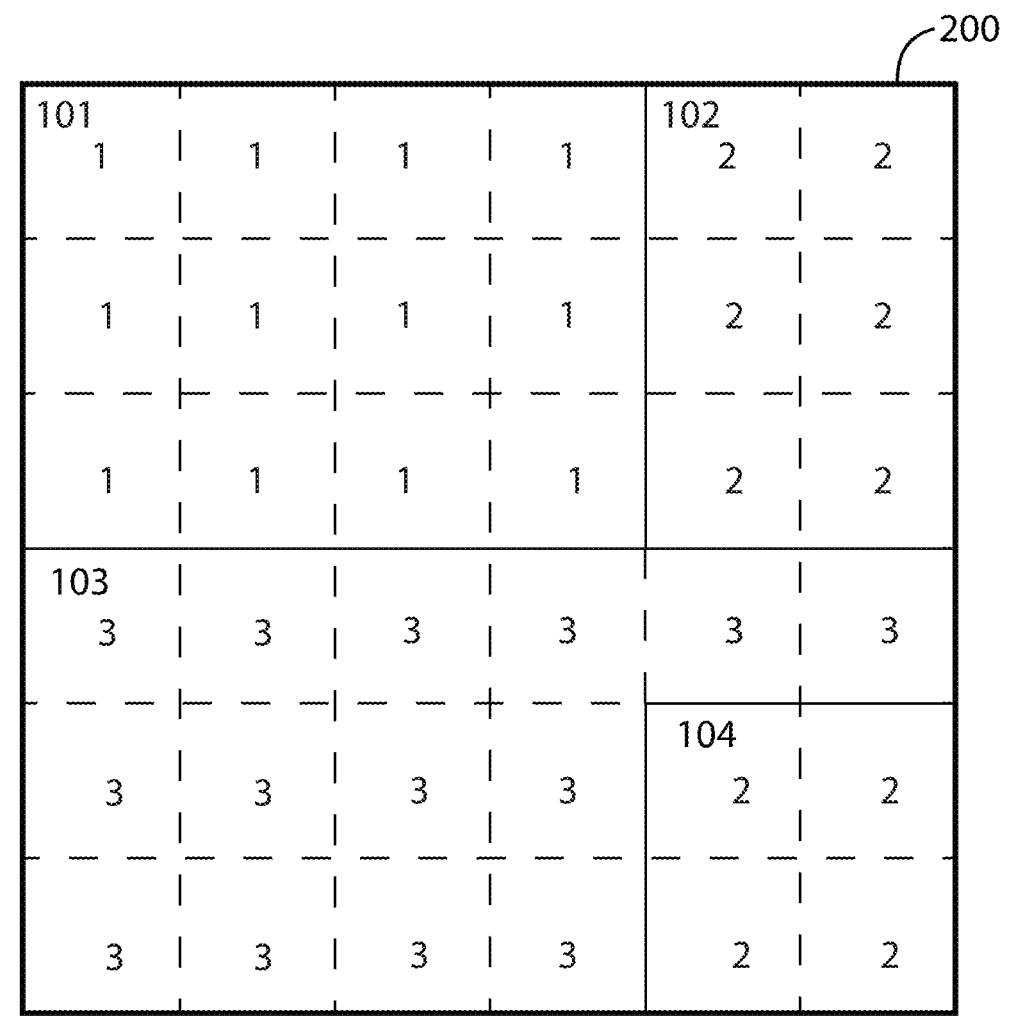

The processor may mark the floor types of different locations (e.g., in each of the unit tiles of the illustrated tiling) of environment 100 in corresponding cells of grid map 200 of environment 100. FIG. 3 illustrates as example of categories with integer labels denoting floor types in locations of environment 100 corresponding with the cells of grid map 200 of environment 100. In this example, numerical categories 1, 2, and 3 indicate carpet, tile, and hardwood flooring, respectively. In some cases, the ontology may be hierarchical, e.g., floor type→carpet→deep pile→coarse pile. According to grid map 200, master bedroom 101 is carpeted, master bathroom 102 and powder room 104 are tiled while living room and dining room 103 are hardwood flooring. Based on the floor type of each cell, the processor of robotic cleaning device 105 adjusts the speed of motors of different components of robotic cleaning device 105 in real-time such that they are suitable for the type of flooring being cleaned, e.g., a motor driving a left wheel, a motor driving a right wheel, a motor driving a main brush, a motor driving an impeller for vacuum pressure, a motor driving a left side brush, or a motor driving a right side brush (the left and right wheels an main brush having axis of rotation that are parallel to one another and the floor and the left and right side brushes having axes of rotation normal to a plane of the floor). For example, when cleaning cells with floor type 1 (carpet), the processor increases the speed of an impeller as more suction is required to vacuum all dust and debris that may be lodged within the carpet. When on floor types 2 (tile) or 3 (hardwood), the processor reduces the speed of the impeller motor as debris is more easily lifted from hard flooring and activates peripheral brushes. In some embodiments, the processor combines grid map 200 with an aggregated grid map formed by the combination of grid maps from previous working sessions of robotic device 105.

Figure 4:
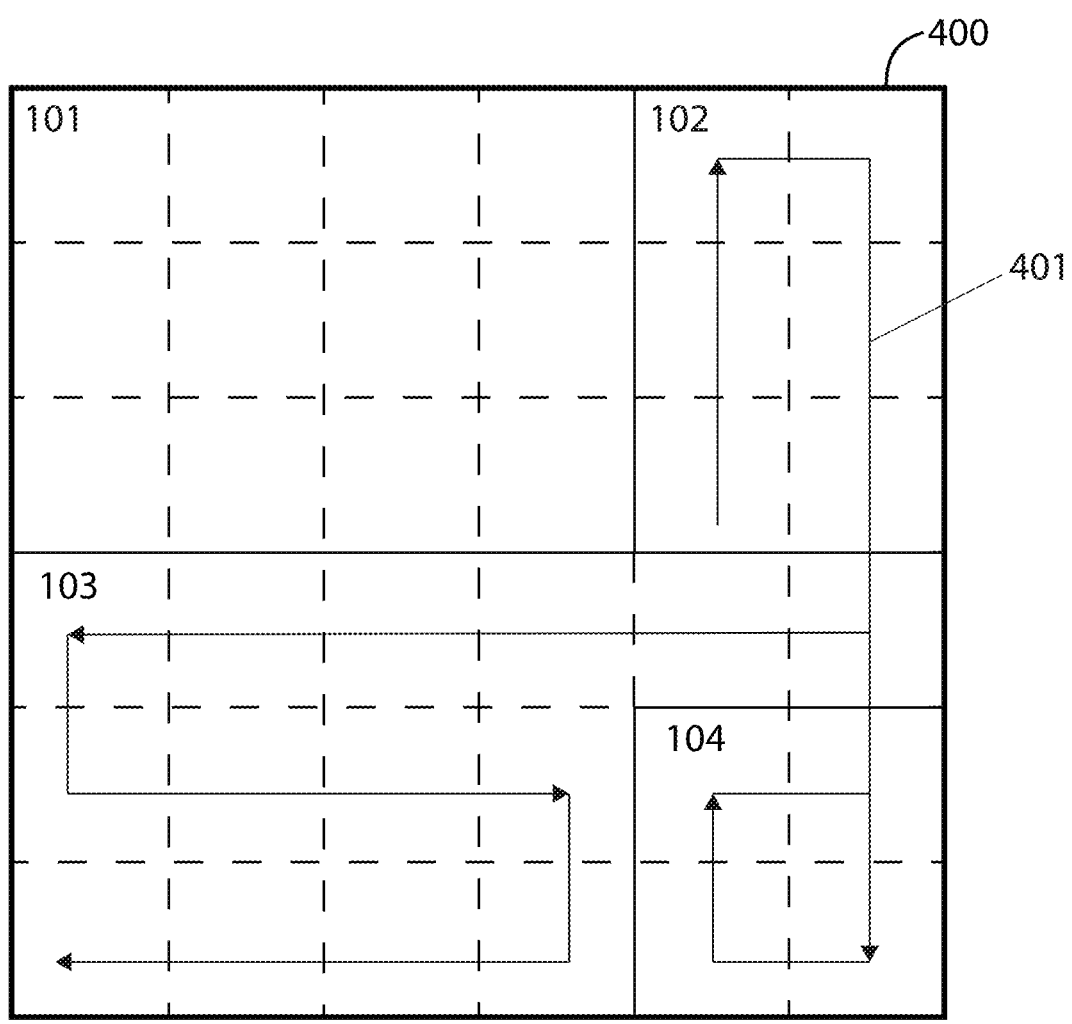
FIG. 4 illustrates an example of a cleaning map generated for the work environment with a cleaning path determined based on the values associated with each grid cell according to some embodiments.

FIG. 4 illustrates an example of cleaning map 400 generated for environment 100 with cleaning path 401 determined based on the floor type associated with each cell in grid map 200 of FIG. 3. In this example, the processor generates cleaning path 401 covering areas that can be cleaned using a slow impeller speed in order to reduce noise disturbances. Therefore, the cleaning path generated covers cells with floor types, such as tile (numerical value of 2) and hardwood flooring (numerical value of 3), that do not require a high suctioning power.

Figure 5:
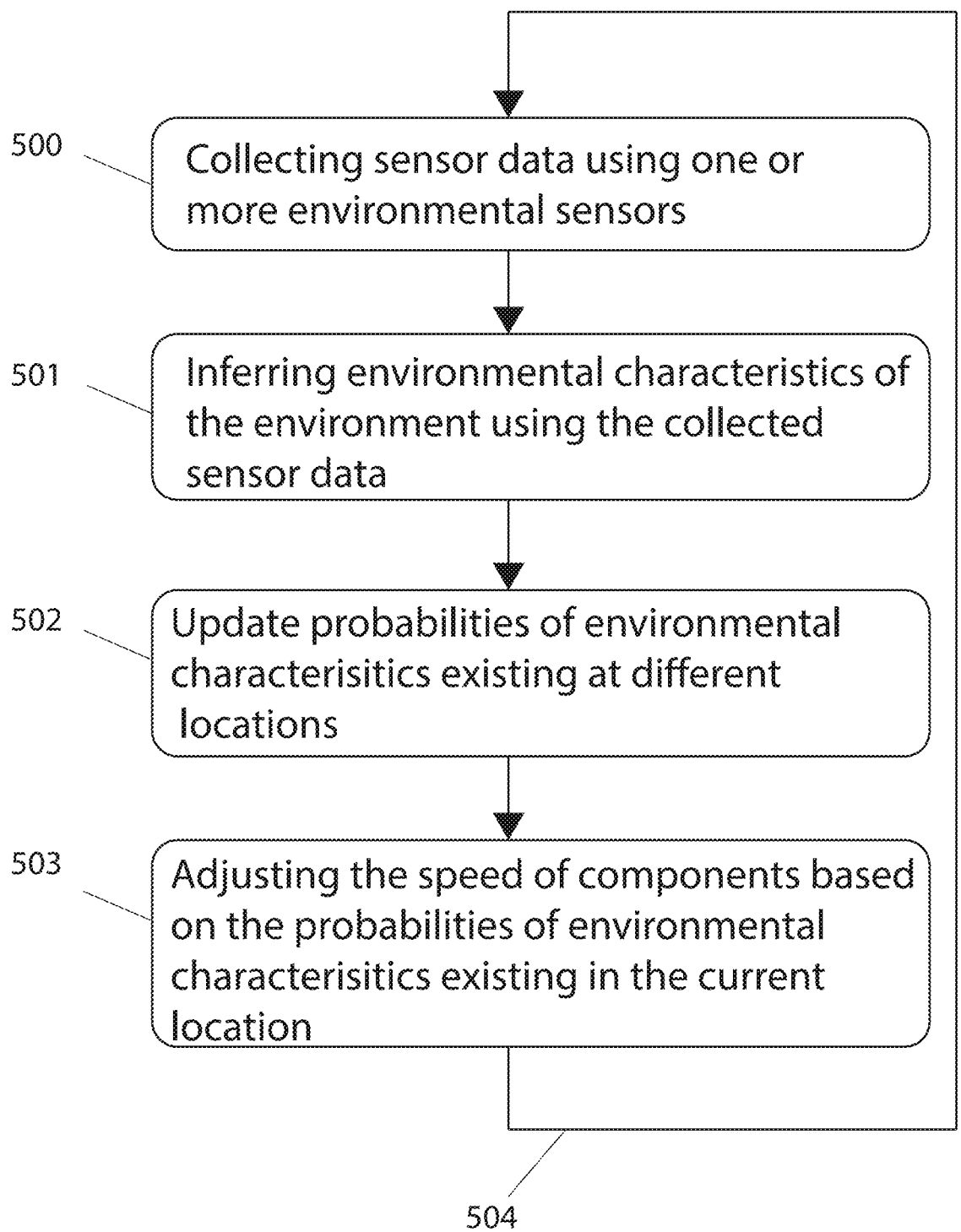
FIG. 5 illustrates a flowchart describing an example of a method for controlling the speed of a main brush using sensor input according to some embodiments.

FIG. 5 illustrates a flowchart with steps 500, 501, 502, 503, and 504 describing an example of a method for autonomously adjusting the speed of components of a robotic vacuum using sensor data. The process of the flow chart may be executed by one or more of the processors described herein, in some cases, with different steps being executed by different processors in communication with one another via a network or system board, as is the case of the other processes described herein.

In some embodiments, a similar optimization approach is applied to different types of robotic devices with different functions. For example, a robotic lawn mowing device with at least one processor and environmental sensor, for example, for measuring the height of grass. In this example, the processor determines the areas of the environment with higher likelihood of having overgrown grass and subsequently areas requiring higher cutting blade speed.

In some embodiments, maps may be three dimensional maps, e.g., indicating the position of walls, furniture, doors, and the like in a room being mapped. In some embodiments, maps may be two dimensional maps, e.g., point clouds or polygons or finite ordered list indicating obstructions at a given height (or range of height, for instance from zero to 5 or 10 centimeters or less) above the floor. Two dimensional maps may be generated from two dimensional data or from three dimensional data where data at a given height above the floor is used and data pertaining to higher features are discarded. Maps may be encoded in vector graphic formats, bitmap formats, or other formats.

The robotic cleaning device may, for example, use the map to autonomously navigate the environment during operation, e.g., accessing the map to determine that a candidate route is blocked by an obstacle denoted in the map, to select a route with a route-finding algorithm from a current point to a target point, or the like. In some embodiments, the map may be stored in memory for future use. Storage of the map may be in temporary memory such that a stored map is only available during an operational session or in more permanent forms of memory such that the map is available at the next session or startup. In some embodiments, the map is further processed to identify rooms and other segments. In some embodiments, a new map is constructed at each use, or an extant map is updated based on newly acquired data.

Some embodiments may reference previous maps during subsequent mapping operations. For example, embodiments may apply Bayesian techniques to simultaneous localization and mapping and update priors in existing maps based on mapping measurements taken in subsequent sessions. Some embodiments may reference previous maps and classifying objects in a field of view as being moveable objects or debris upon detecting a difference of greater than a threshold size.

In some embodiments, all data are processed on the robotic device. In other embodiments, some data are processed on at least one separate device, such as a docking station of the robotic device or through another device.

In some embodiments, the robotic cleaning device or equivalents thereof (e.g., robot, robotic device, robotic cleaner, robotic vacuum) may include one or more autonomous or semi-autonomous robotic cleaning devices having communication, an actuator, mobility, and/or processing elements. Such robotic cleaning devices may include, but are not required to include (which is not to suggest that any other described feature is required in all embodiments), a casing (e.g., such as a shell), a chassis, wheels and a motor to drive the wheels or another mobility system, a receiver that acquires signals and a transmitter that transmits signals, a processor that, among other functions, receives, processes, and transmits information, and processes methods and operations, a network or wireless communication system (e.g., Wi-Fi or Bluetooth), USB ports, a power management system for delivering (and in some cases storing) electrical power, one or more controllers that, among other functions, control motors of the robotic device, memory, one or more clocks or synchronizing devices, etc. Robotic cleaning devices may also include sensors for observing the environment, such as sensors for detecting obstructions, types of flooring, cliffs, system status, debris, etc., and sensors for measuring movement, distance, temperature, etc. Examples of sensors include IR sensors, tactile sensors, sonar sensors, gyroscopes, optical encoder, odometer, ultrasonic range finder sensors, depth sensing cameras, odometer sensors, optical flow sensors, LIDAR, cameras, IR illuminator. An interface system may also be included to provide an interface between the robotic cleaning device and the user (e.g., a remote control, a touch screen on the robot or on an application of a communication device paired with the robotic cleaning device, a screen of an electronic device, voice activation, etc.). In some instances, the robotic cleaning device may also include a mapping system, a localization system, a path planning system, a scheduling system, etc. Different systems of the robotic cleaning device may be combined or may be separate components. Other types of robots with other configurations may also be used.

In some embodiments, the robotic cleaning device further includes one or more main brushes and one or more peripheral brushes. The main brush may rotate about an axis parallel to the floor and the peripheral brush may rotate about an axis normal to the floor. The main brush may have a contact area that is more than, for example, 1.5 times, 2 times, 3 times, or 5 times larger than that of the peripheral brush. During cleaning, power applied to the main brush may be, for example, more than 1.5 times, 2 times, 3 times, or 5 times larger than that of the peripheral brush. Some embodiments include a peripheral brush of a robotic cleaning device including a gear train (or other mechanical system affording a mechanical advantage, like belt and pulley systems, contact wheels of different sizes, and the like) capable of rotation in two directions (e.g., about a given axis of rotation and when assembled into the robot) and connected to (e.g., such that it is configured to drive rotation of the brush) the peripheral brush such that the peripheral brush can be manually (e.g., with less than, for example, 1,000 inch-ounces, like less than 500 inch-ounces, such as less than 100 inch-ounces) rotated in two directions when the peripheral brush is powered off or spinning is suspended (e.g., due to entanglement with an obstruction). In some embodiments, manual rotation of the peripheral brush can be by, for example, a user or an obstruction. For example, a user can manually rotate a peripheral brush of a robotic cleaning device when it is turned off in one or two directions to remove any obstructions, such as hair or cables, from the peripheral brush or to access different modules through the bottom of the robotic cleaning device such as a brush guard, battery or front wheel. In some cases, manual rotation may be achieved without gear stripping (e.g., without teeth of gears ceasing to mesh and sliding over one another). In some cases, manual rotation may be achieved with or without the coupled motor turning as well. The ability to rotate in two directions is expected to protect against damage that can be inflicted on the gears by forceful manual rotation of a connected peripheral brush in a direction in which the brush is not configured to operate. In another example, an obstruction can manually rotate a peripheral brush in either direction when the peripheral brush is turned off, such as during the docking process, as the robotic cleaning device moves past the obstruction thereby reducing the possibility of getting stuck due to an obstruction. In some embodiments, the gear train and connected peripheral brush are configured to automatically rotate in one or two directions during operation using an electric power supply. For example, a processor of a robotic cleaning device may command a motor to automatically rotate a peripheral of the robotic cleaning device back and forth in opposite directions to loosen any obstructions that become entangled during operation. In some embodiments, motor acceleration and torque may be lower during such a loosening process than when cleaning, or some embodiments may increase these operational parameters to break the brush free. An obstruction (or otherwise obstacle) may include, but is not limited to, objects, items, or matter that may compromise operation of the robotic device or components thereof in a working environment. Examples are cords, cables, wires, toys, debris, dust, dirt, rocks, hair, thread, liquid substances, or other objects, items or matter that may compromise the functionality or operation (e.g., clogging suction channels, entanglements with brushes, etc.) of components of the robotic device or the robotic device itself. Additionally, obstructions may include objects, items, or matter that may cause damage to the robotic device or components thereof (e.g., due to a collision) or prevent the robotic device or components thereof from functioning or operating properly (e.g., a liquid substance interfering with vacuuming function).

In some embodiments, the gear train includes one or more of spur gears, helical gears, bevel gears, and/or other types of gears that can be used to assemble a gear train capable of rotation in two directions such that the peripheral brush can be manually rotated in two directions when the peripheral brush is powered off or spinning is suspended. Some embodiments may implement similar techniques with harmonic gears, belt-and-pulley stems, contact wheels, or magnetic gears. In some embodiments, the gear train with connected peripheral brush is configured to automatically rotate in one or two directions using an electric supply during operation. For example, a processor of a robotic cleaning device may command a motor to automatically rotate a peripheral brush back and forth upon detecting entanglement with an obstruction (e.g., with less than 720 degrees, or 360 degrees rotation in a given direction in each quarter cycle). In some embodiments, the processor detects entanglement with an obstruction by monitoring the power supplied to the motor of the gear train as entanglement with an obstruction often results in an increase in power supplied to the gear train to maintain the desired peripheral brush speed.

Figure 6:
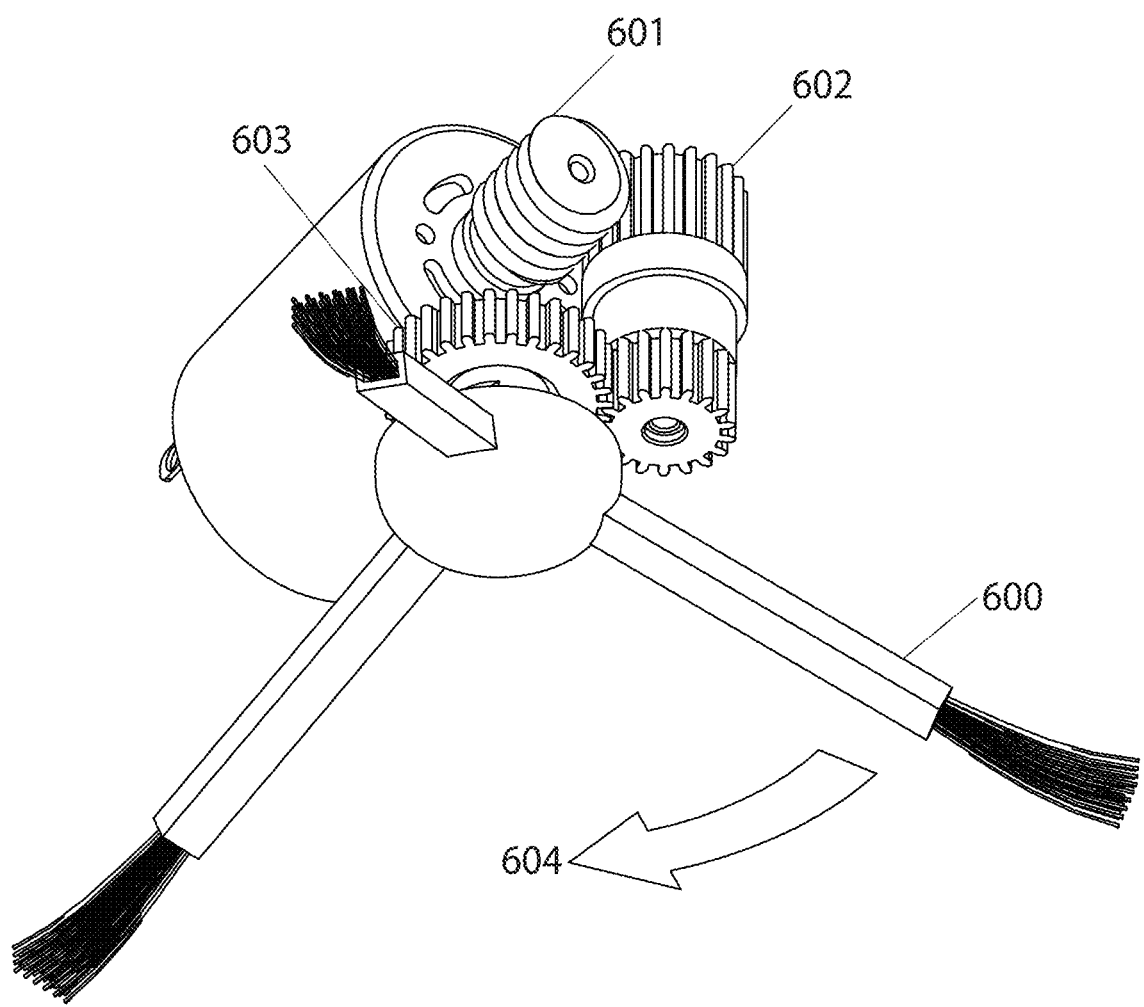
FIG. 6 illustrates a peripheral brush with a gear train comprising a worm gear capable of rotation in one direction according to some embodiments.

FIG. 6 illustrates peripheral brush 600 connected to a gear train comprising worm 601 as the drive gear. Worm 601 interfaces with worm gear 602 interfacing with gear 603 connected to peripheral brush 600. The gear train and connected peripheral brush 600 are only capable of rotation in one direction such that peripheral brush 600 can only rotate in direction 604 both automatically during electrical operation of the peripheral brush and manually when the peripheral brush is powered off. In other words, the mechanical system of FIG. 6 only permits power to be delivered in one direction, from the motor to the brush. The brush cannot drive rotation of the motor because the direction of transmission of the worm gear is not reversible. The direction of rotation of the gear train is not reversible due to friction forces between worm 601 and worm gear 602. The gear teeth of worm gear 602 lock against the gear teeth of worm 601 as the force component circumferential to worm 601 is not sufficient enough to overcome the friction generated from sliding contact between the worm gear pair. Therefore, attempting rotation of peripheral brush 600 in a direction opposite direction 604 (e.g., when the motor is not being driven in that opposite direction) may result in gear damage and/or stalling of peripheral brush 600. In some cases, the motor is configured to be driven in only one direction of rotation.

Figure 7A:
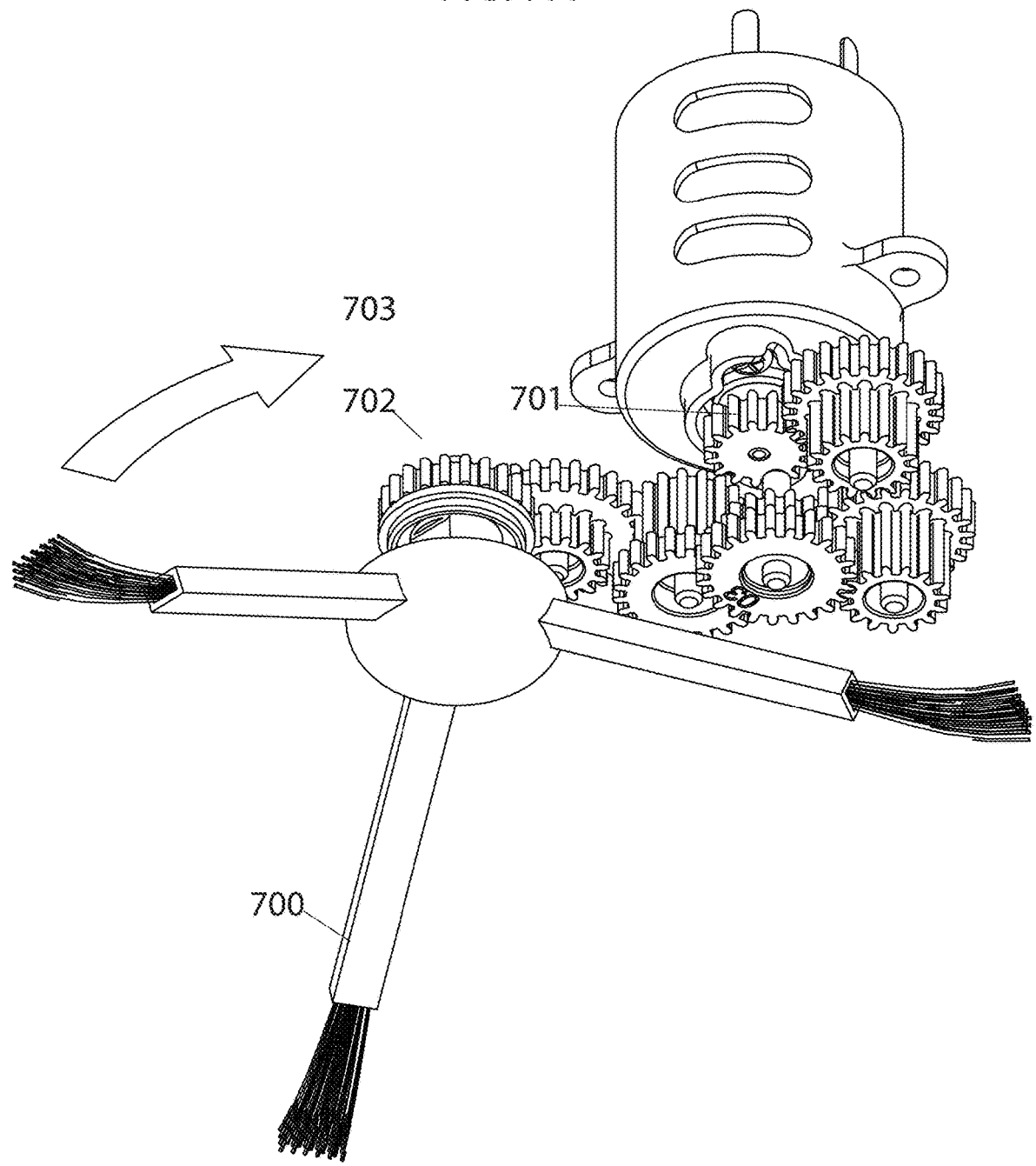
FIGS. 7A and 7B illustrate a peripheral brush with a gear train comprising spur gears capable of rotation in two directions according to some embodiments.
Figure 7B:
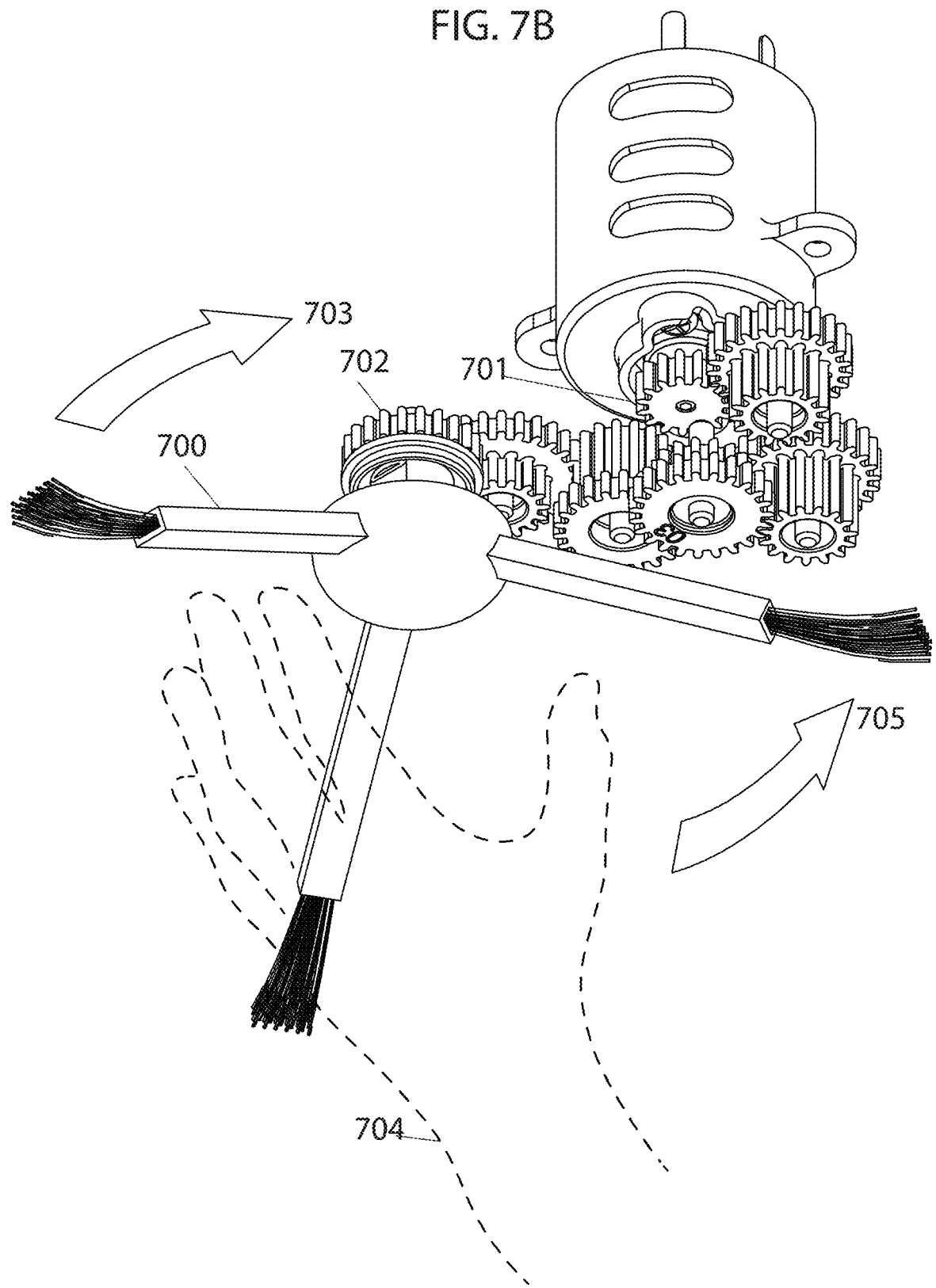
Figure 8A:
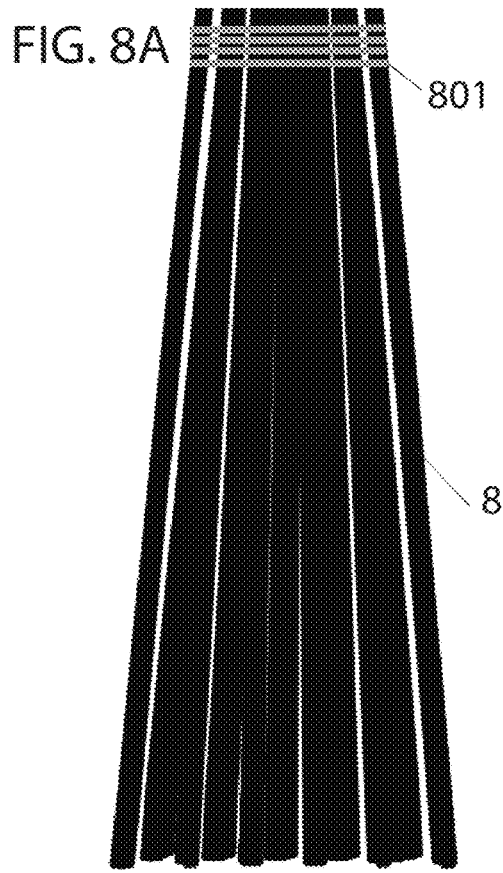
FIGS. 8A-8D and 9A-9D illustrate examples of different stitching techniques for stitching bristles together and/or to the one or more arm of the peripheral brush according to some embodiments.
Figure 8B:
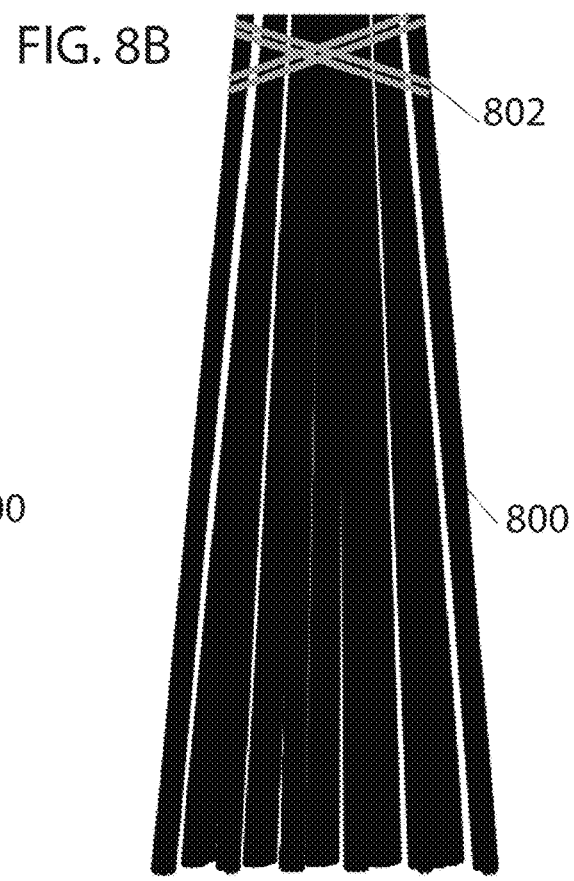
Figure 8C:
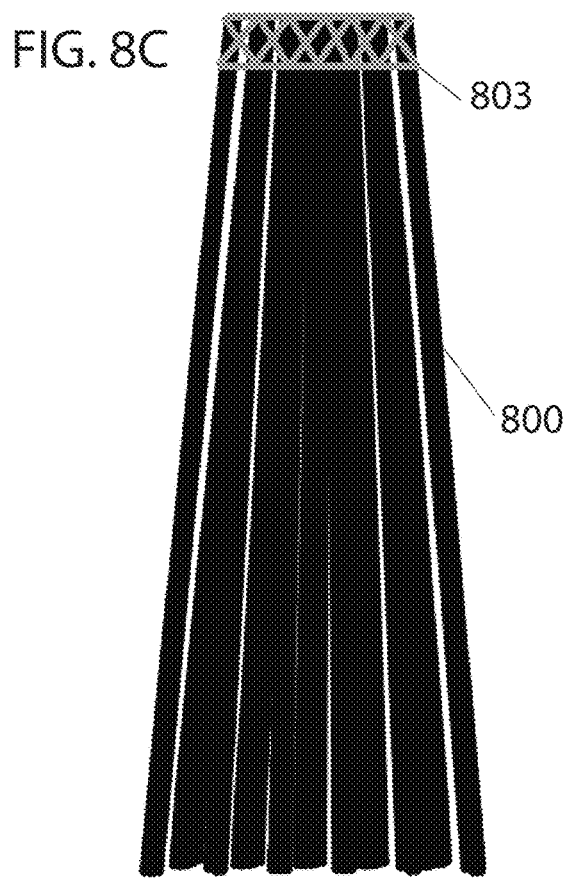
Figure 8D:
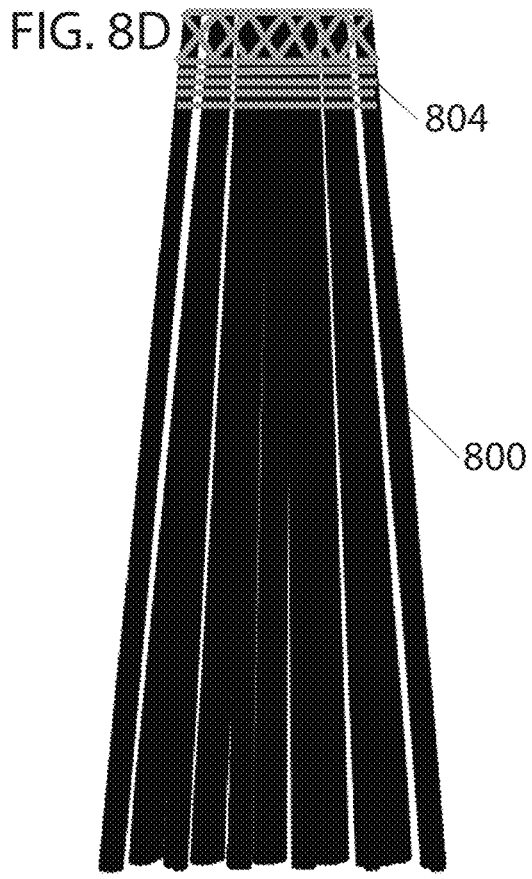

FIG. 7A illustrates peripheral brush 700 connected to a gear train comprising driving gear 701. Multiple spur gears connect with one another to rotate spur gear 702 and connected peripheral brush 700. In the illustration shown, the gear train and connected peripheral brush 700 are configured to automatically rotate in direction 703 using an electric supply during operation. In other embodiments, the gear train and connected peripheral brush 700 can be configured to automatically rotate in two directions during operation. Since spur gears are used, peripheral brush 700 may, but need not be, be manually rotated in two directions when the peripheral brush is powered off or spinning is suspended. FIG. 7B illustrates manual rotation of peripheral brush 700 and connected gear train by user 704 in directions 703 and 705. Manual rotation of peripheral brush 700 may be required to remove obstructions or to access components through the bottom of the robotic cleaner to which peripheral brush 700 belongs. In some embodiments, the direction of transmission of the gear train may be reversible, such that the brush may drive rotation of the motor when the brush is rotated by hand, and the motor may drive rotation of the brush when the motor is powered. The illustrated transmission with a reversible direction of transmission is shown for a peripheral brush, but similar techniques may be applied to drive a main brush.

In some embodiments, different mechanisms are used to oscillate the peripheral brush. Examples of oscillating mechanisms for a peripheral brush are provided in U.S. patent application Ser. No. 15/924,176, the entire contents of which are hereby incorporated by reference.

In some embodiments, the peripheral brush of the robotic cleaner includes one or more arms (three are shown) to which bristles are securely attached such that bristles remain in place when pulled and/or at risk of being plucked from the one or more arms of the peripheral brush. In some embodiments, the arms are hollowed tubes. In some embodiments, the bristles are secured to the one or more arms of the peripheral brush using stitching. In some embodiments, the bristles are bundled together and securely stitched to the one or more arms, forming one or more compact and firm brushes that result in more effective sweeping of debris as bristles are not lost over time and the brush maintains its fullness. In some embodiments, the secure stitching of bristles to the one or more arms of the peripheral brush avoid the bristles from being forcibly plucked during operation when, for example, the bristles become entangled with or caught up with an obstruction (e.g. cable, hair, or carpet) or make contact with a sticky substance or become lodged between objects and the robotic cleaner or when the peripheral brush continues or attempts to continue to rotate when entangled with an obstruction.

Figure 9A:
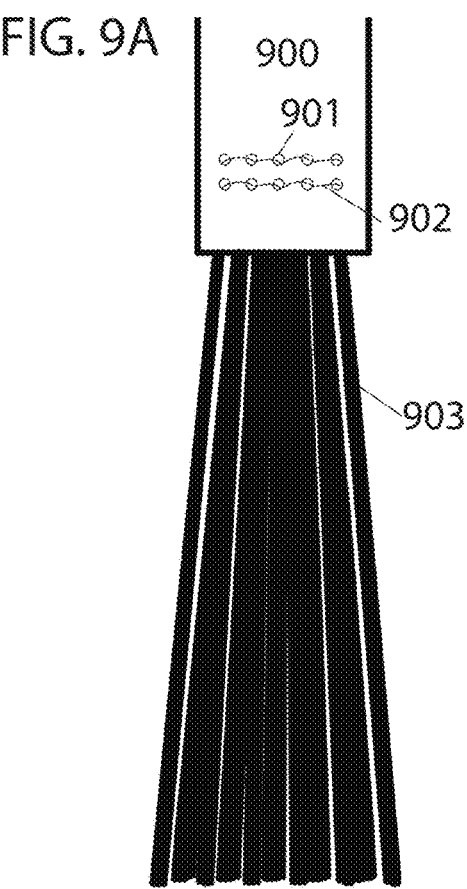
Figure 9B:
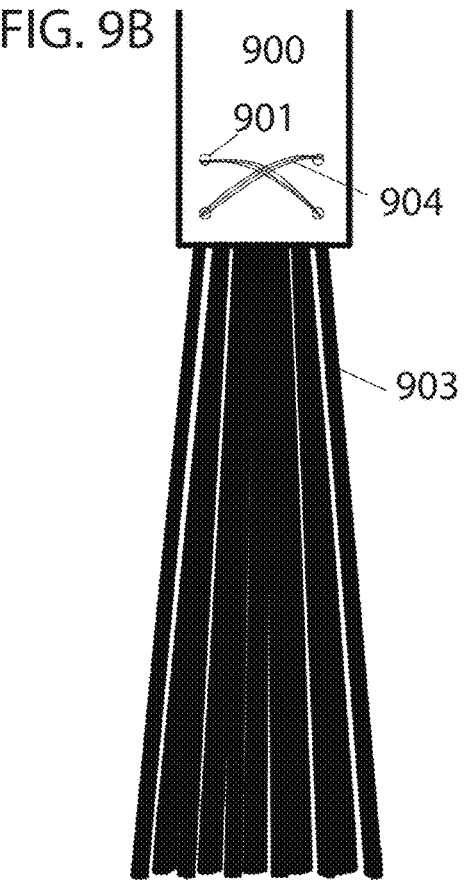
Figure 9C:
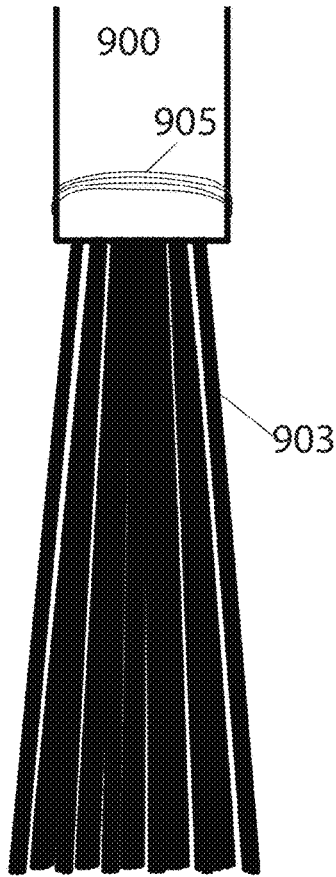
Figure 9D:
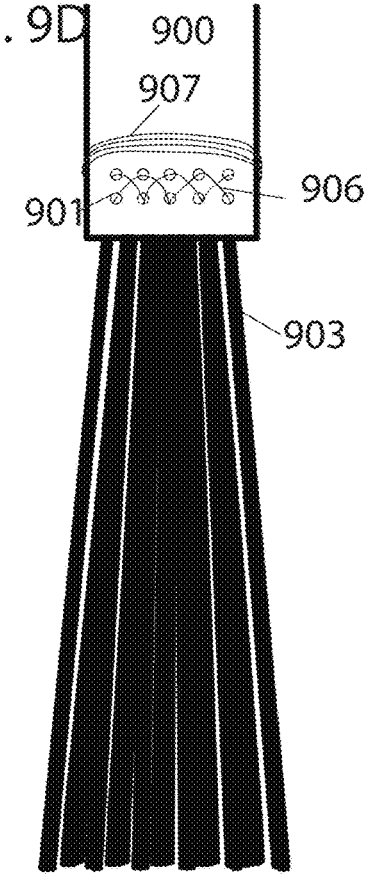

In some embodiments, the stitching technique used to stitch the bristles together and/or to the one or more arms of the peripheral brush can vary. For example, stitching the bristles together can include stitching across the bundle of bristles in a straight line in a direction perpendicular to the length of the bristles. In another example, stitching the bristles together can include stitching diagonally across the bristles in two directions. In other instances, other stitching techniques can be used, such as stitching in a crisscross pattern. In some embodiments only one type of stitching technique is used while in other embodiments more than one type of stitching technique is used. In some embodiments, a stitching technique is repeated multiple times. For example, multiple parallel stitching lines along an end of the bundle directed perpendicular to the length of the bristles can be used to increase the fastening strength of the bristles to one another. FIGS. 8A-8D illustrate examples of stitching techniques including across a bundle of bristles 800 using straight line technique 801, diagonal technique 802, crisscross technique 803, and combined straight line and crisscross techniques 804, respectively. In some embodiments, the bristles are stitched together and then stitched to the one or more arms of the peripheral brush. In some embodiments, the one or more arms of the peripheral brush include small openings through which the stitching material can be weaved in order to stitch the bristles to the one or more arms. Similar to FIG. 8, any stitching technique can be used in stitching the bristles to the one or more arms. For example, FIG. 9A illustrates arm 900, with small openings 901 on the top surface of arm 900 through which stitching material is weaved in an in and out pattern 902 to secure bristles 903 to arm 900. In FIG. 9B, openings 901 in arm 900 are placed on the top surface such that a diagonal stitching technique 904 can be used to stitch bristles 903 to arm 900. In FIG. 9C, openings 901 in arm 900 are placed on side surfaces (not shown) such that a straight stitching technique 905 can be used to stitch bristles 903 to arm 900. In FIG. 9D, openings 901 are placed on the top surface and side surfaces (not shown) of arm 900 such that crisscross pattern 906 and straight stitching 907 techniques can be used simultaneously for extra reinforcement.

In some embodiments, the material used for stitching the bristles to the one or more arms of the peripheral brush can include, but are not limited to, thread, twine, nylon, silicon, metal, glue, or the like.

In some embodiments, other methods for securing the bristles together and/or to the one or more arms of the peripheral brush are used. For example, the bristles can be secured to the one or more arms of the peripheral brush using a clamp spanning across the bristles and secured to the one or more arms. In another example, the bristles are secured to one another and to the one or more arms of the peripheral brush by using heat to melt the bristles into one another and the one or more arms. In another instance, glue can be used to secure the bristles to one another and/or the one or more arms of the peripheral brush. In some embodiments, the bristles are secured to one another using one type of method and secured to the peripheral brush using another type of method. For example, bristles can be glued together on one end and securely attached to the one or more arms of the peripheral brush using stitching. In some embodiments, multiple methods of securing the bristles to one another and/or to the peripheral brush are used simultaneously.

Figure 10:
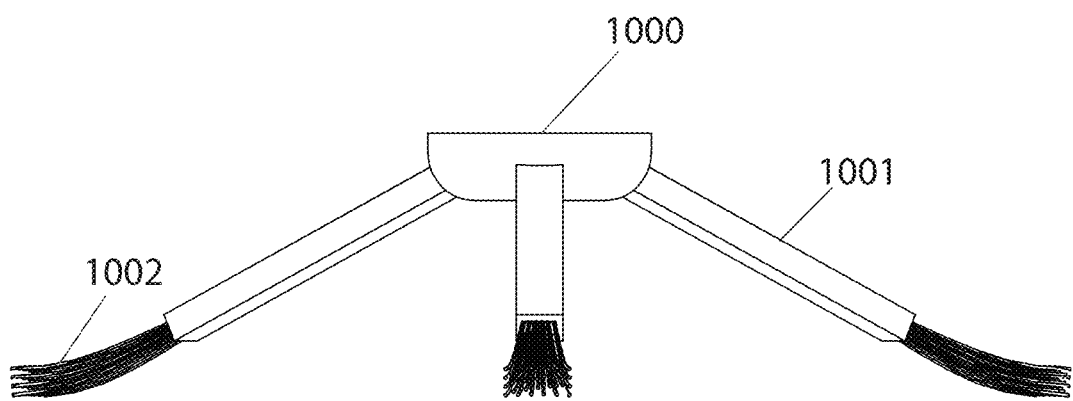
FIGS. 10-12 illustrate examples of a peripheral brush of a robotic cleaner according to some embodiments.

In some embodiments, the one or more arms of the peripheral brush are hollowed and the bristles extend out from an end of the one or more arms. In some embodiments, the length of the portion of bristles within the hollowed arm varies. In some embodiments, the portion of the bristles within the one or more hollowed arms are secured within the one or more hollowed arms using one or more of the securing methods described herein or using another method of securing the bristles to the one or more arms of the peripheral brush. FIG. 10 illustrates peripheral brush 1000 with hollowed arms 1001 and bristles 1002 extending out from arms 1001. The portion of bristles 1002 within hollowed arms 1001 are secured to hollowed arms 1001.

Figure 11:
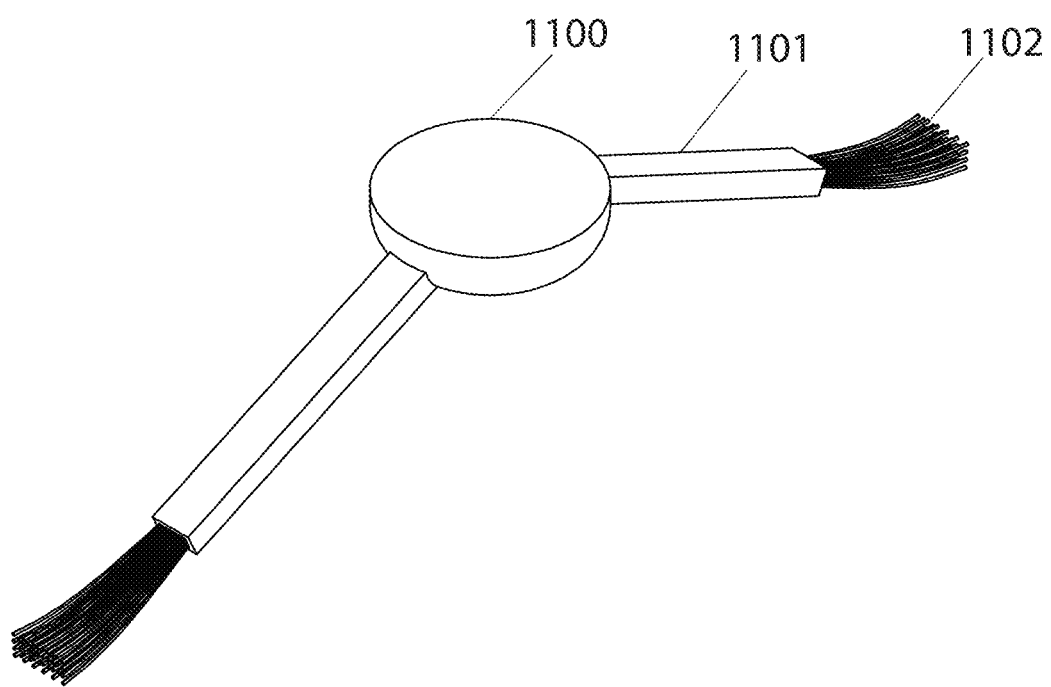
Figure 12:
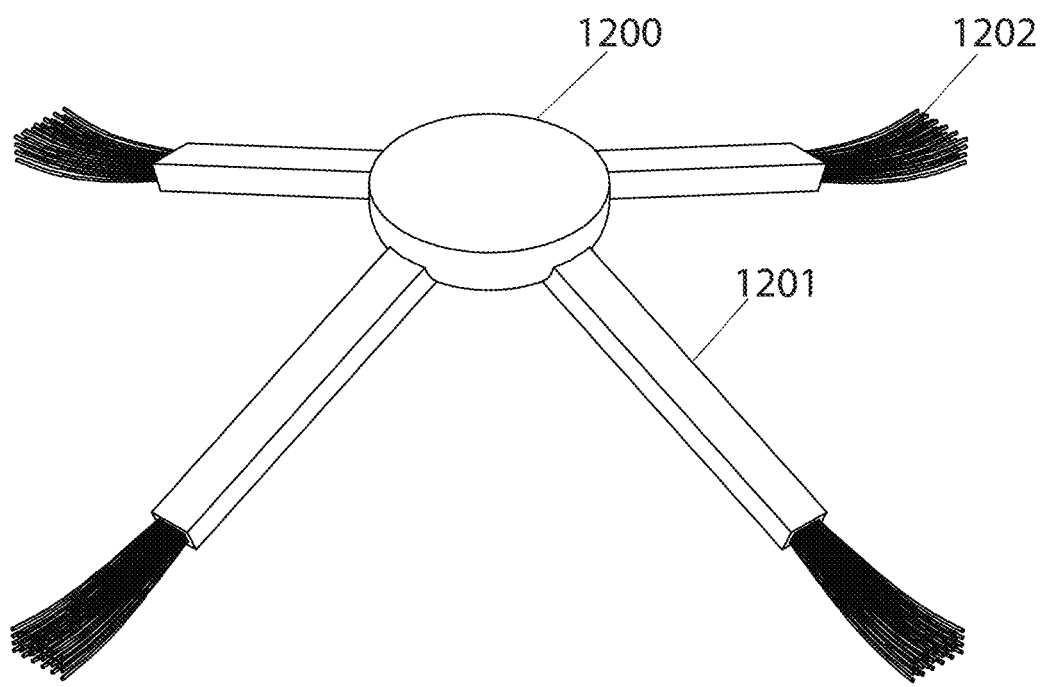

The number of arms of the peripheral brush may vary. In some embodiments, the arms are arranged in a rotationally symmetric array around an axis of rotation of a peripheral brush. Various combinations are possible, for example, some peripheral brushes include one arm while other peripheral brushes include two, five, seven or any other number of reasonable arms. For example, FIG. 11 illustrates peripheral brush 1100 with two arms 1101 and bristles 1102 while FIG. 12 illustrates peripheral brush 1200 with four arms 1201 and bristles 1202.

In some embodiments, wherein the robotic cleaner includes more than one peripheral brush, each peripheral brush can be operated independently. For example, a processor of a robotic device with three peripheral brushes can choose to power peripheral brush one and power off peripheral brush two and three or can choose to power on peripheral brush one and three and power off peripheral brush two. This embodiment is further described in U.S. patent application Ser. No. 16/024,263, the entire contents of which are hereby incorporated by reference, which provides, for example, embodiments of a method and apparatus of a mobile robotic cleaning device using multiple side brushes and embodiments of a mobile robotic cleaning device with the ability to control multiple side brushes independently of one another.

In some embodiments, the length of the one or more arms of the peripheral brush are identical. In alternative embodiments, the length of the one or more arms of the peripheral brush are different. In some embodiments, the one or more arms of the peripheral brush retract or extend to become shorter or elongated.

In some embodiments, the bristles of the peripheral brush retract or extend to become shorter or elongated. In some embodiments, the bristles retract or extend from within the one or more hallowed arms of the peripheral brush.

Figure 13A:
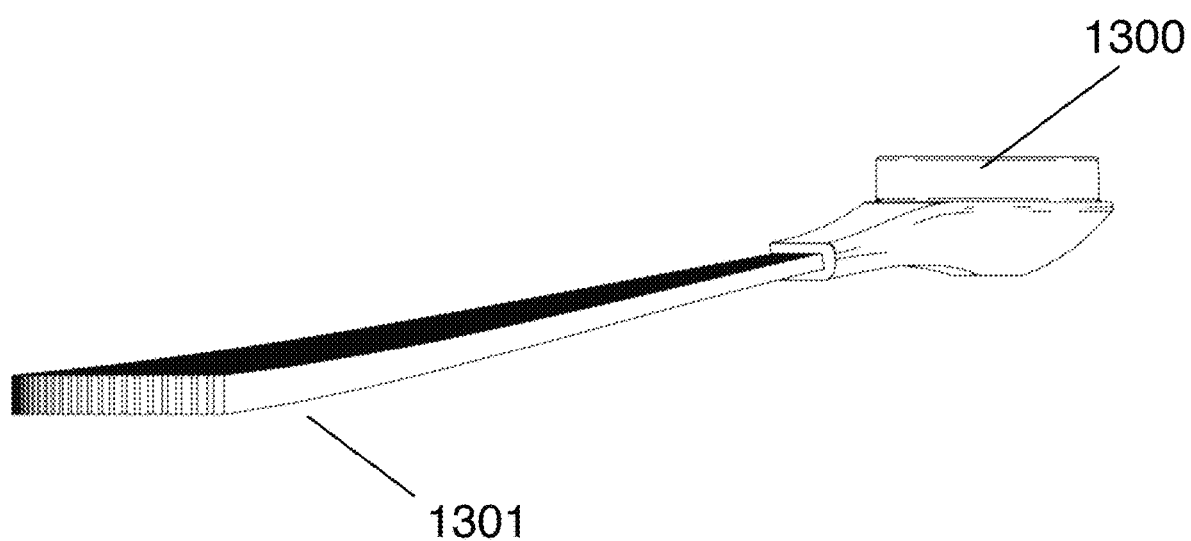
FIGS. 13A and 13B illustrate examples of a peripheral brush with long soft bristles according to some embodiments.
Figure 13B:
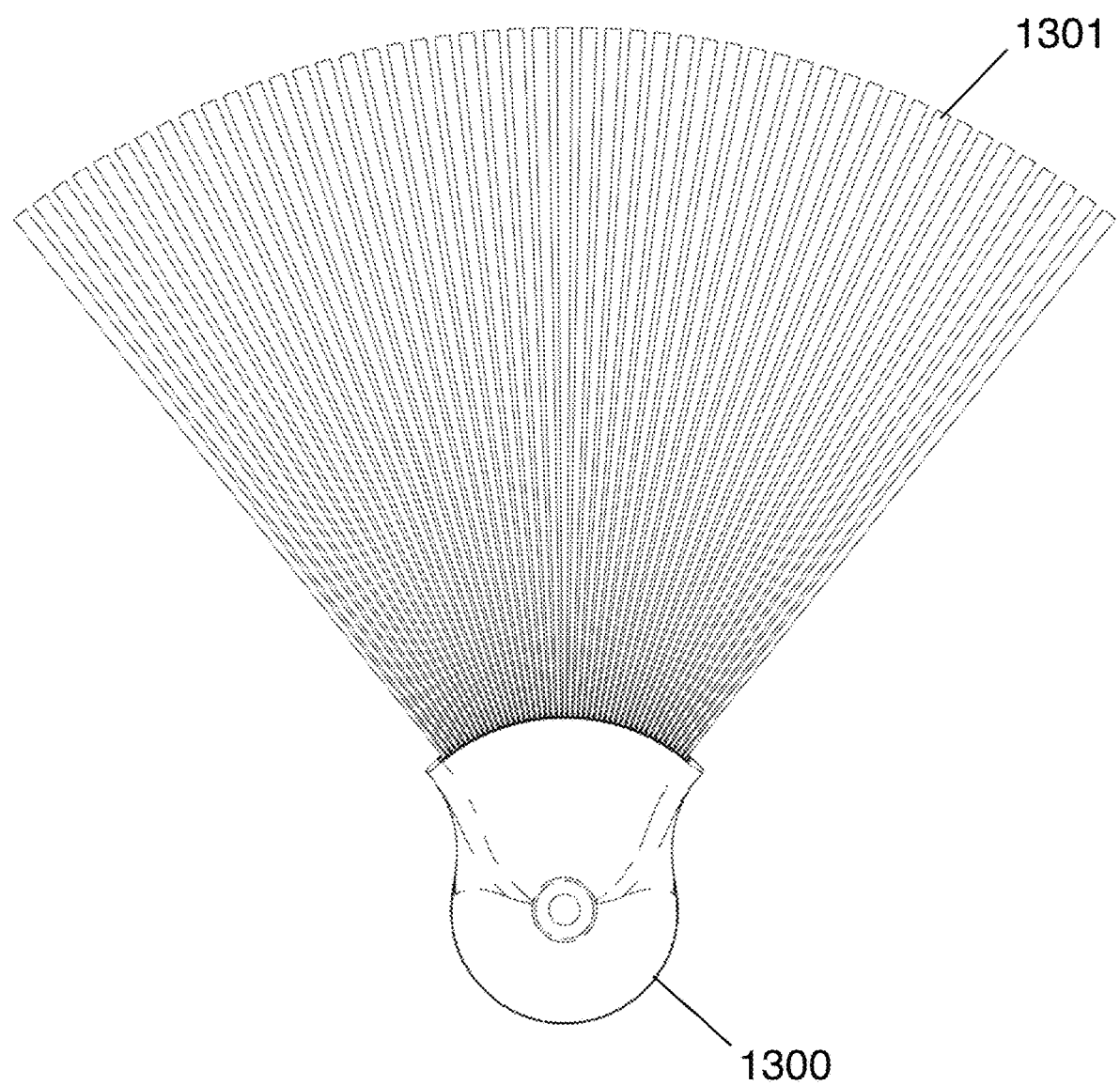

In some embodiments, the length of the portion of exposed bristles is smaller in proportion to the length of the arm such that entanglement with obstruction is more likely to occur with the one or more arms as opposed to the brush bristles thereby maintaining the condition of the brush. In some embodiments, the bristles of the peripheral brush are soft and elongated to prevent bristles from becoming entangled with obstructions as they may sweep over them as opposed to firmer bristles that are more likely to become lodged or entangled with obstructions. For example, FIGS. 13A and 13B illustrate side and top views of peripheral brush 1300 with long soft bristles 1301. Examples of peripheral brushes with long soft bristles are further described in U.S. patent application Ser. No. 16/203,385, the entire contents of which is hereby incorporated by reference.

In some embodiments, the peripheral brush is easily attached and removed to a chassis of a robotic cleaner by, for example, snapping into and out of the chassis of the robotic cleaner, e.g., by engaging the brush via a resilient latch. In alternative embodiments, the peripheral brush is attached to the chassis by, for example, screws, glue, sliding into a socket or by other means.

In some embodiments, the one or more peripheral brushes are substantially parallel and in close proximity to the adjacent bottom surface of the robotic cleaning device such that the likelihood of entanglement with obstructions is minimized. The close proximity between the one or more peripheral brushes and adjacent bottom surface of the robotic cleaner may reduce the likelihood of capturing obstructions between the two as there is no room for such obstructions to fit. In some embodiments, the portion of the bottom surface of the robotic cleaning device to which the peripheral brush is coupled is formed to follow the same form as the peripheral brush such that the arms and bristles of the peripheral brush are parallel and in close proximity to the adjacent bottom surface of the robotic cleaning surface. In some embodiments, the arms are parallel and in close proximity to the adjacent bottom surface of the robotic cleaning surface and the bristles are substantially parallel and in close proximity to the adjacent bottom surface.

In some embodiments, the motor is angled such that the angles of bundles with respect to the driving surface plane is different as the bundle rotates 360 degrees, for optimal cleaning.

In some embodiments, the robotic cleaner includes various numbers of peripheral brushes. For example, the robotic cleaner can include one, three, five, or any reasonable number of peripheral brushes.

In some embodiments, the one or more peripheral brushes include a side brush cover to prevent interaction with obstructions. An example of a side brush cover is provided in U.S. patent application Ser. No. 15/647,472, the entire contents of which are hereby incorporated by reference.

In some embodiments, a processor of the robotic cleaner monitors the current drawn by the driving motor of the one or more peripheral brushes. In some embodiments, the processor detects when the current drawn by the driving motor of the one or more peripheral brushes increases beyond a predetermined current and in response suspends spinning of the one or more peripheral brushes, turns off the power to the one or more peripheral brushes, turns off the robotic cleaner and/or executes another response. When a peripheral brush operates normally, the current drawn by its driving motor generally remains within an expected range, however, when the peripheral brush is jammed due to, for example, entanglement with or lodging against an obstruction (e.g., a cord, carpet, etc.), the driving motor draws more current as the motor attempts to continue to rotate. The processor monitoring current drawn by the driving motors of the one or more peripheral brushes can prevent damage to the robotic cleaner.

In some embodiments, a thin, long, rectangular rubber element, such as a rubber squeegee, is coupled to the base of the robotic cleaner behind the main brush such that any dust and debris missed by the main brush can be accumulated by the rubber element. The edge of the rubber element drags against the working surface to accumulate and prevent the escape of dust and debris.

Figure 14A:
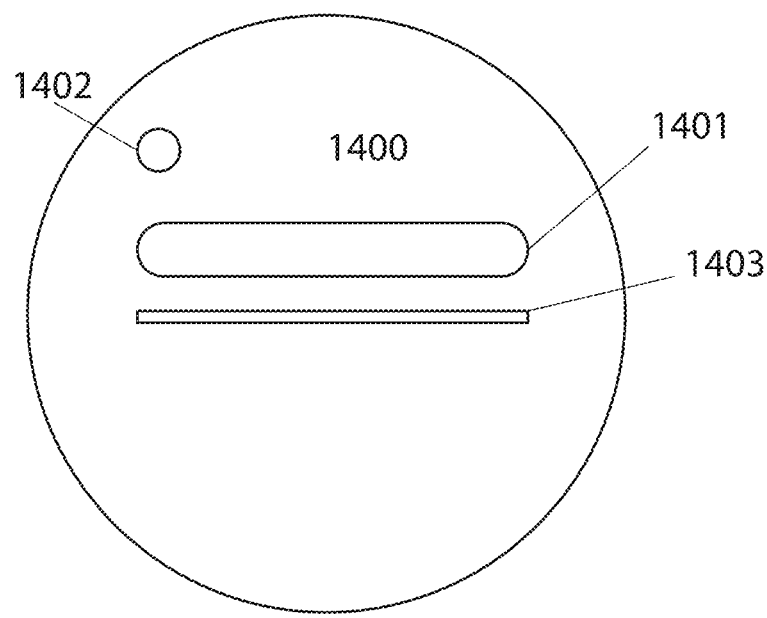
FIGS. 14A and 14B illustrate a rubber element of a robotic cleaner for collecting dust and debris according to some embodiments.
Figure 14B:
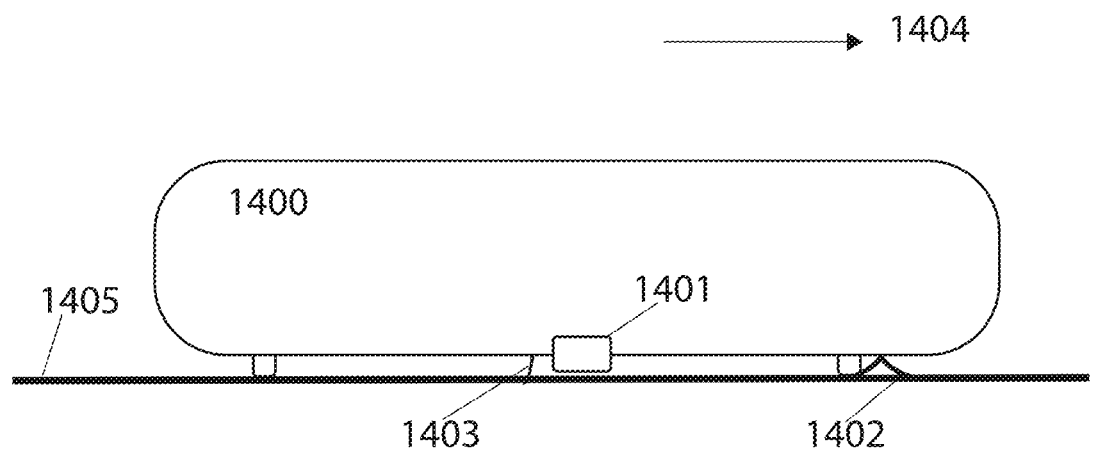

FIG. 14A illustrates a bottom view of robotic cleaner 1400 with main brush 1401, side brush 1402 and rubber element 1403 positioned behind main brush 1401. FIG. 14B illustrates a side view of robotic cleaner 1400 with main brush 1401, side brush 1402 and rubber element 1403 positioned behind main brush 1401. As robotic cleaner 1400 moves in direction 1404 along working surface 1405, any dust and debris missed by main brush 1401 and side brush 1402 may be accumulated and prevented from escaping by rubber element 1403 dragging against working surface 1405 as robotic cleaner 1400 moves in direction 1404. In some embodiments, robotic cleaner 1400 may stop at regular intervals, rotate and move in an opposite direction such that main brush 1401 can clean dust and debris collected by rubber element 1403. In other embodiments, other programmatic instructions are used to clean dust and debris collected by rubber element 1403.

Figure 15:
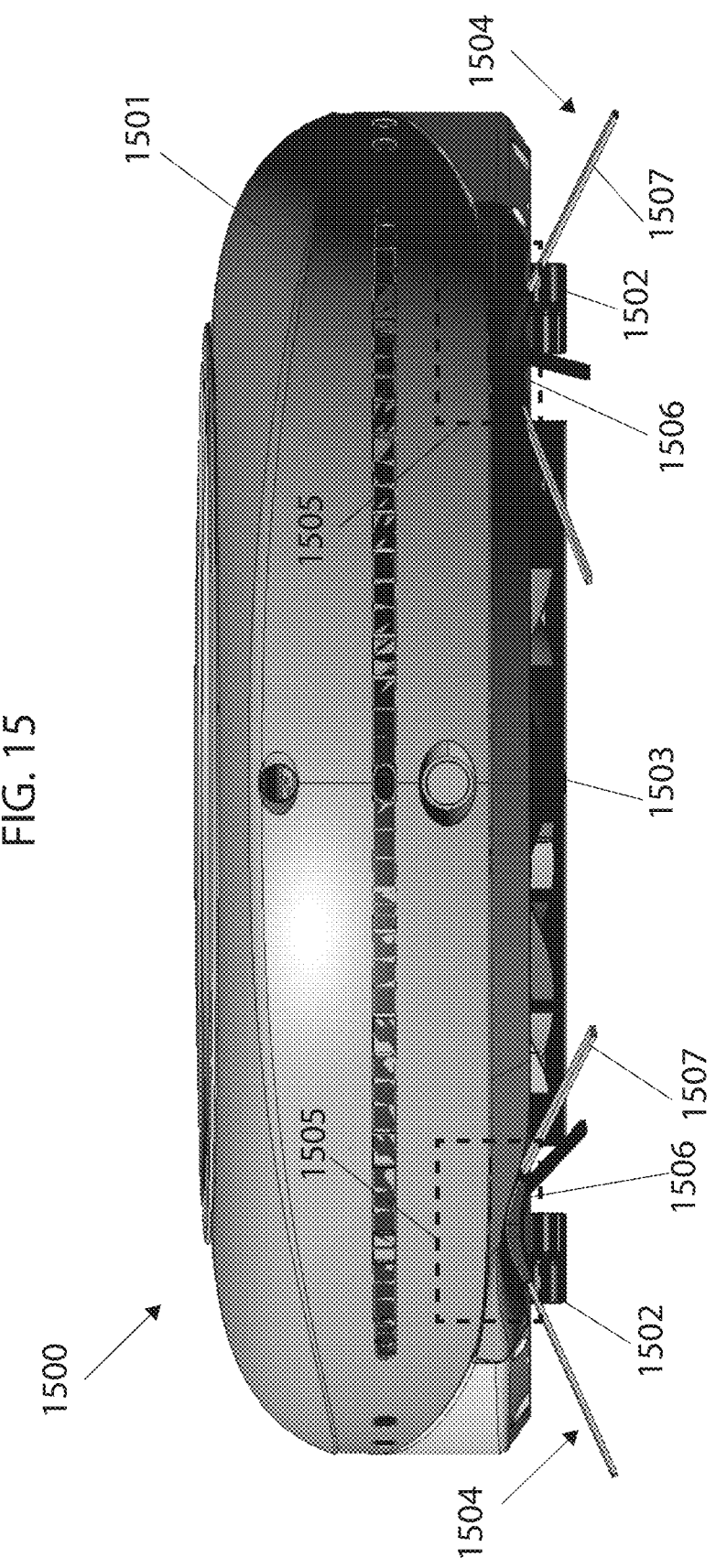
FIG. 15 illustrates an example of a robotic cleaning device with main brush and side brushes according to some embodiments.

FIG. 15 illustrates an example of a robotic cleaner with peripheral brushes. Robotic cleaning device 1500 includes, among other components, a chassis 1501, wheels 1502, a main brush 1503, and two peripheral brushes 1504 attached to chassis 1501. The portions of the bottom surface 1505 of the robotic cleaning device to which peripheral brushes 1504 are coupled is formed to follow the same form as peripheral brushes 1504 such that arms 1506 and bristles 1507 of peripheral brushes 1504 are substantially parallel and in close proximity to the adjacent bottom surface of the robotic cleaning surface. In this case, arms 1506 are parallel and in close proximity to adjacent bottom surface 1505 of the robotic cleaning surface and bristles 1507 are substantially parallel and in close proximity to adjacent bottom surface 1505. In this way, the likelihood of entanglement with an obstruction or lodging of an obstruction is reduced. In some cases, the angle 1508 is further reduced.

Figure 16:
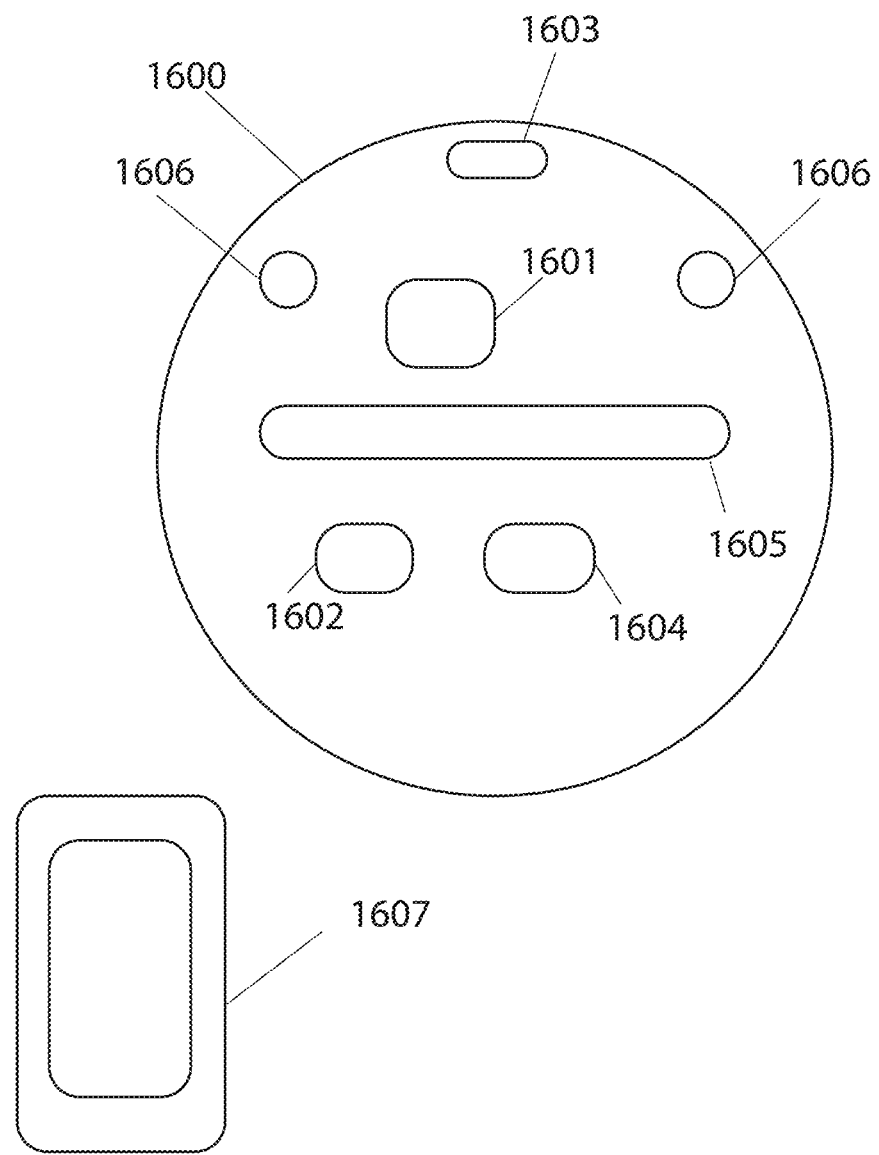
FIG. 16 illustrates an example of a robotic cleaning device and a communication device paired with the robotic cleaning device according to some embodiments by which the techniques in the figures above may be implemented.

FIG. 16 illustrates an example of a robotic cleaning device 1600 with a processor 1601, memory 1602, one or more sensors 1603, actuator 1604, main brush 1605, and side brushes 1606. In some embodiments, the robotic cleaner 1600 may include the features of a robotic cleaner described herein. In some embodiments, program code stored in the memory 1602 and executed by the processor 1601 may effectuate the operations described herein. Some embodiments additionally include communication device 1607 (e.g., mobile device, laptop, remote control, specialized computer, desktop computer, tablet, etc.) having a touchscreen 1608 and that executes an application by which the user interfaces with robotic cleaner 1600. In some embodiments, processor 1601 and memory 1602 implement some of the functionality described herein. In some embodiments, a user may provide instructions to robotic cleaner 1600 to perform certain tasks or to use certain settings at certain times or in certain areas of the environment using an application of communication device 1607 wirelessly paired with robotic cleaner 1600.

Although various methods and techniques are described herein, it should be kept in mind that some of the present techniques may also be implemented as articles of manufacture that include a computer readable medium (a term which as used herein broadly refers to a single medium storing all instructions or media in use cases where different subsets of instructions are stored on different media) on which computer-readable instructions for carrying out embodiments of the inventive methods or technique are stored. The computer readable medium may include, for example, semiconductor, magnetic, opto-magnetic, optical, or other forms of computer readable medium for storing computer readable code. Further, the inventions may also be embodied as apparatuses. Such apparatus may include circuits, dedicated and/or programmable, to carry out tasks pertaining to embodiments of the invention. Examples of such apparatus may include a specialized computer and/or a dedicated computing device when appropriately programmed and may include a combination of a computer/computing device and dedicated/programmable circuits adapted for the various tasks pertaining to embodiments of the inventions.

In block diagrams provided herein, illustrated components are depicted as discrete functional blocks, but embodiments are not limited to systems in which the functionality described herein is organized as illustrated. The functionality provided by each of the components may be provided by software or hardware modules that are differently organized than is presently depicted. For example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The present techniques will be better understood with reference to the following enumerated embodiments:

1. A robot, comprising: a first actuator; a first sensor; one or more processors communicatively coupled to the first actuator and to the first sensor; and memory storing instructions that when executed by at least some of the one or more processors effectuate operations comprising: determining a first location of the robot in a working environment; obtaining, with the first sensor, first data indicative of an environmental characteristic of the first location; and adjusting a first operational parameter of the first actuator based on the sensed first data, wherein the adjusting is configured to cause the first operational parameter to be in a first adjusted state while the robot is at the first location.

2. The robot of embodiment 1, wherein: the first actuator is a motor configured to drive rotation of a vacuum impeller, fan, or blower; the first operational parameter is motor speed or torque; the environmental characteristic is a type of flooring in an ontology of floor types that distinguishes between carpet flooring and other types of flooring; and adjusting comprises increasing the motor speed or torque in response to determining the robot is over carpet flooring relative to motor speed or torque applied when the robot is over other types of flooring.

3. The robot of embodiment 1, wherein: the first sensor is configured to sense dirt on a floor of the working environment; and the operations comprise forming or updating a dirt map of the working environment based on data output by the first sensor over a plurality of cleaning sessions.

4. The robot of embodiment 1, wherein: the robot comprises a main brush and a peripheral brush; the actuator is configured to drive the main brush or the peripheral brush; and the peripheral brush comprises a plurality of arms.

5. The robot of embodiment 4, wherein: at least some of the arms comprise bristles extending from the respective arm, the bristles being secured to one another with stitching using one or more of the following techniques: stitching a line across the bristles in a direction perpendicular to the length of the bristles, stitching two lines in opposite directions diagonally across the width of the bristles, or stitching a crisscross pattern across the bristles in a direction perpendicular to the length of the bristles.

6. The robot of embodiment 4, comprising: a second actuator configured to drive rotation of the peripheral brush; a transmission coupling the second actuator to the peripheral brush, wherein: the transmission has a gearing ratio configured to cause the peripheral brush to rotate at a slower speed than the second actuator; and the transmission has a reversible direction of transmission.

7. The robot of embodiment 6, wherein: friction of the transmission to rotation driving by application of power from the peripheral brush is less than ten times friction of the transmission to rotation driven by application of power from the second actuator.

8. The robot of embodiment 6, wherein the transmission is configured to be manually rotated by a person turning the peripheral brush by hand.

9. The robot of embodiment 1, wherein: the first actuator is one of the following: a motor configured to drive the robot, a ultraviolet light, a motor configured to drive a pump, a solenoid valve, a motor configured to drive a vacuum impeller, a motor configured to drive a main brush, a motor configured to drive a peripheral brush, an actuator configured to adjust a height of the main brush or peripheral brush, a motor configured to drive a mop, a motor configured to drive blades of a grass cutter, or a motor configured drive a blower.

10. The robot of embodiment 1, wherein: the first sensor is one of the following: a motion sensor, a debris sensor, a current sensor, a torque sensor, a planarity sensor, a hardness sensor, an acoustic sensor, a cliff sensor, distance sensor, a tactile sensor, obstacle sensor, an imaging sensor or an optical sensor.

11. The robot of embodiment 1, wherein: the first location is determined with simultaneous localization and mapping based on data from a plurality of sensors of the robot; and the robot comprises means for autonomously adjusting operational parameters of actuators based on currently sensed and historically sensed environmental characteristics of the working environment.

12. The robot of embodiment 1, wherein the operations comprise: causing the robot to traverse the working environment; and mapping a plurality of environmental characteristics of the working environment with the first sensor and a second sensor.

13. The robot of embodiment 12, wherein the operations comprise: determining at least part of a route of the robot based on locations of environmental characteristics of the working environment indicated by the mapping.

14. The robot of embodiment 12, wherein the operations comprise: adjusting a second operational parameter of a second actuator based on locations of environmental characteristics of the working environment indicated by the mapping.

15. The robot of embodiment 1, wherein the operations comprise: inferring the environmental characteristic of the first location based on the first data and a second data obtained from one or more historical working sessions of the robot obtained while the robot was previously at the first location.

16. The robot of embodiment 1, wherein the operations comprise: determining a second location of the robot in the working environment; obtaining, with the first sensor, second data indicative of the environmental characteristic of the second location; and adjusting the first operational parameter of the first actuator based on the sensed second data to cause the first operational parameter to be in a second adjusted state while the robot is at the second location.

17. The robot of embodiment 1, wherein the operations comprise: classifying an area including the first location and corresponding the area to a unit tile of a regular tiling map of the working environment based on the first data to indicate an inferred type of flooring.

18. The robot of embodiment 17, wherein the operations comprise: scoring the unit tile based on historical rates of dirt accumulation in the area corresponding to the unit tile.

19. The robot of embodiment 1, the operations comprising: causing values based on data sensed by the first sensor to be sent via a network to a remote computing system; and receiving, from the remote computing system, a multi-channel bitmap with spatial dimensions corresponding to locations in the working environment and a plurality of environmental-characteristic dimensions having values at each spatial coordinate of the spatial dimensions.

20. The robot of embodiment 1, wherein the operations comprise: decreasing motor speed in response to determining that the robot is at a location where people are present or are historically present; increasing main-brush speed in response to determining that the robot is over carpet; and increasing vacuum impeller speed in response to determining that the robot is over an area with a higher historical amount of dirt accumulation than other areas of the working environment.

We claim:

1. A robot, comprising:
a main brush;
a peripheral brush;
a first actuator;
a first sensor, wherein the first sensor is an optical sensor;
one or more processors communicatively coupled to the first actuator and to the first sensor; and
memory storing instructions that when executed by at least some of the one or more processors effectuate operations comprising:
determining a first location of the robot in a working environment;
obtaining, with the first sensor, first data indicative of an environmental characteristic of the first location;
adjusting a first operational parameter of the first actuator based on the sensed first data, wherein the adjusting is configured to cause the first operational parameter to be in a first adjusted state while the robot is at the first location; and
forming or updating a debris map of the working environment based on data output by the first sensor or another sensor configured to sense debris on a floor of the working environment over a plurality of cleaning sessions, wherein:
the first actuator or another actuator is configured to drive the main brush or the peripheral brush;
the peripheral brush comprises a plurality of arms; and
at least some of the arms comprise bristles extending from the respective arm, the bristles being secured to one another with stitching using one or more of the following techniques: stitching a line across the bristles in a direction perpendicular to the length of the bristles, stitching two lines in opposite directions diagonally across the width of the bristles, or stitching a crisscross pattern across the bristles in a direction perpendicular to the length of the bristles, wherein the one or more techniques prevents bristles from being forcibly plucked during operation of the robot.

2. The robot of claim 1, wherein:
the first actuator is a motor configured to drive rotation of a vacuum impeller, fan, or blower;
the first operational parameter is motor speed or torque;
the environmental characteristic is a type of flooring in an ontology of floor types that distinguishes between carpet flooring and other types of flooring; and
adjusting comprises increasing the motor speed or torque in response to determining the robot is over carpet flooring relative to motor speed or torque applied when the robot is over other types of flooring.

3. The robot of claim 1, wherein:
the first sensor is configured to sense debris on the floor of the working environment.

4. The robot of claim 1, comprising:
a second actuator configured to drive rotation of the peripheral brush;
a transmission coupling the second actuator to the peripheral brush, wherein:
the transmission has a gearing ratio configured to cause the peripheral brush to rotate at a slower speed than the second actuator; and
the transmission has a reversible direction of transmission.

5. The robot of claim 4, wherein the transmission is configured to be manually rotated by a person turning the peripheral brush by hand.

6. The robot of claim 1, wherein:
the first actuator is one of the following: a motor configured to drive the robot, a ultraviolet light, a motor configured to drive a pump, a solenoid valve, a motor configured to drive a vacuum impeller, a motor configured to drive a main brush, a motor configured to drive a peripheral brush, an actuator configured to adjust a height of the main brush or peripheral brush, a motor configured to drive a mop, a motor configured to drive blades of a grass cutter, or a motor configured drive a blower.

7. The robot of claim 1, comprising:
a second sensor coupled to one or more processors, wherein:
the environmental characteristic is inferred based on output from both the first sensor and the second sensor, and
the second sensor is one of the following: a motion sensor, a debris sensor, a current sensor, a torque sensor, a planarity sensor, a hardness sensor, an acoustic sensor, a cliff sensor, distance sensor, a tactile sensor, or an obstacle sensor.

8. The robot of claim 1, wherein:
the first location is determined with simultaneous localization and mapping based on data from a plurality of sensors of the robot; and
the robot comprises means for autonomously adjusting operational parameters of actuators based on currently sensed and historically sensed environmental characteristics of the working environment.

9. The robot of claim 1, wherein the operations comprise:
causing the robot to traverse the working environment; and
mapping a plurality of environmental characteristics of the working environment with the first sensor and a second sensor.

10. The robot of claim 9, wherein the operations comprise:
determining at least part of a route of the robot based on locations of environmental characteristics of the working environment indicated by the mapping.

11. The robot of claim 9, wherein the operations comprise:
adjusting a second operational parameter of a second actuator based on locations of environmental characteristics of the working environment indicated by the mapping.

12. The robot of claim 1, wherein the operations comprise:
inferring the environmental characteristic of the first location based on the first data and a second data obtained from one or more historical working sessions of the robot obtained while the robot was previously at the first location.

13. The robot of claim 1, wherein the operations comprise:
determining a second location of the robot in the working environment;

obtaining, with the first sensor, second data indicative of the environmental characteristic of the second location; and adjusting the first operational parameter of the first actuator based on the sensed second data to cause the first operational parameter to be in a second adjusted state while the robot is at the second location.

14. The robot of claim 1, wherein the operations comprise:
classifying an area including the first location and corresponding the area to a unit tile of a regular tiling map of the working environment based on the first data to indicate an inferred type of flooring.

15. The robot of claim 14, wherein the operations comprise:
scoring the unit tile based on historical rates of dirt accumulation in the area corresponding to the unit tile.

16. The robot of claim 1, the operations comprising:
causing values based on data sensed by the first sensor to be sent via a network to a remote computing system; and
receiving, from the remote computing system, a multichannel bitmap with spatial dimensions corresponding to locations in the working environment and a plurality of environmental-characteristic dimensions having values at each spatial coordinate of the spatial dimensions.

17. The robot of claim 1, wherein the operations comprise:
decreasing motor speed in response to determining that the robot is at a location where people are present or are historically present;
increasing main-brush speed in response to determining that the robot is over carpet; and
increasing vacuum impeller speed in response to determining that the robot is over an area with a higher historical amount of dirt accumulation than other areas of the working environment.

18. The robot of claim 1, wherein:
the optical sensor is a time-of-flight sensor, a structured light sensor, or a camera.

19. The robot of claim 1, wherein:
the environmental characteristic is a type of flooring,
the optical sensor is on or adjacent a bottom of the robot; and
the floor type is inferred based on an amount of distortion or scattering of light caused by flooring at the first location and sensed by the optical sensor.

20. A robot, comprising:
a main brush;
a peripheral brush;
a first actuator;
a first sensor configured to sense debris on a floor of a working environment;
one or more processors communicatively coupled to the first actuator and to the first sensor; and
memory storing instructions that when executed by at least some of the one or more processors effectuate operations comprising:
determining a first location of the robot in the working environment;
obtaining, with the first sensor, first data indicative of an amount of debris at the first location;
forming or updating a debris map of the working environment based on data output by the first sensor over a plurality of cleaning sessions; and
adjusting a first operational parameter of the first actuator based on the sensed first data, wherein the adjusting is configured to cause the first operational parameter to be in a first adjusted state while the robot is at the first location, wherein:
the first actuator or another actuator is configured to drive the main brush or the peripheral brush;
the peripheral brush comprises a plurality of arms; and
at least some of the arms comprise bristles extending from the respective arm, the bristles being secured to one another with stitching using one or more of the following techniques: stitching a line across the bristles in a direction perpendicular to the length of the bristles, stitching two lines in opposite directions diagonally across the width of the bristles, or stitching a crisscross pattern across the bristles in a direction perpendicular to the length of the bristles, wherein the one or more techniques prevents bristles from being forcibly plucked during operation of the robot.

21. The robot of claim 20, wherein the operations comprise:
segmenting the floor of the working environment into a plurality of cells; and
assigning one or more debris accumulation scores to each of at least some of the cells among the plurality of cells based on one or more of: the data output by the first sensor over the plurality of cleaning sessions, time elapsed since a last cleaning session, and type of cleaning performed in the last cleaning session,
wherein respective one or more debris accumulation scores indicate respective one or more probabilities that respective cells have accumulated more than one or more threshold amount of debris.

22. The robot of claim 21, wherein the operations comprise:
assigning a debris classification to each of at least some of the cells among the plurality of cells based on one or more of: the data output by the first sensor over the plurality of cleaning sessions, time elapsed since a last cleaning session, and type of cleaning performed in the last cleaning session.

23. The robot of claim 21, wherein the operations comprise:
determining a route of the robot through the plurality of cells based on respective debris accumulation scores of the plurality of cells.

24. The robot of claim 20, wherein the operations comprise:
obtaining, with a second sensor, second data indicative of obstacles within the environment;
inferring a level of obstacle density or predicting a risk of stalling or colliding with obstacles in an area of the environment; and
adjusting a wheel speed of the robot based on the level of obstacle density in the area.

25. The robot of claim 20, wherein the robot comprises a mop and wherein the operations comprise:
obtaining, with a third sensor, data indicative of a floor type;
activating or deactivating the mop based on the floor type or an input provided to an application of a communication device paired with the robot.

26. The robot of claim 20, wherein the operations comprise:

authenticating a second robot or a fixed sensing device;

upon authenticating the second robot or the fixed sensing device, establishing a connection with the second robot or the fixed sensing device; and obtaining data from the second robot or the fixed sensing device.

27. The robot of claim 20, wherein the operations comprise:

generating or updating a map of the environment;

dividing the map of the environment into subareas;

obtaining instructions from an application of a communication device paired with the robot based on input provided to the application through a user interface, wherein the application is configured to receive at least one input designating at least one of: a modification, addition, or deletion of information to the map of the environment; a modification or addition of environmental characteristics of different locations within the map of the environment; a modification or addition of floor type of different locations within the map of environment; a modification or addition of levels of debris accumulation of different locations within the map of environment; a modification or addition of a specific type or size of debris of different locations within the map of environment; a modification or addition of obstacles in different locations within the map of environment; a modification, addition, or deletion of perimeters to the map of the environment; a modification, addition, or deletion of doorways to the map of the environment; a modification, addition, or deletion of subareas to the map of the environment; a modification, addition, or deletion of a cleaning path to the map of the environment; a selection or modification of a function of the robot; a selection or modification of a setting of the robot; a selection or modification of a cleaning schedule of the robot; a selection or modification of an order of coverage of subareas; and a selection or modification of impeller speed, main brush speed, wheel speed, or peripheral brush speed.

28. The robot of claim 27, wherein the user interface is an audio user interface of a smart speaker.

29. The robot of claim 20, wherein the operations comprise at least one of:

ordering the subareas for cleaning;

labelling the subareas of the floor plan; and instructing the robot to prioritize cleaning cells with a particular environmental characteristic first.

30. A method for controlling a first actuator of a robot, comprising:

determining, with a processor of the robot, a first location of a robot in a working environment;

obtaining, with a first sensor of the robot, first data indicative of an amount of debris at the first location;

forming or updating, with the processor of the robot, a debris map of the working environment based on data output by the first sensor, wherein:

the first sensor is configured to sense debris on a floor of the working environment;

the processor is communicatively coupled to the first actuator and to the first sensor;

the robot comprises a main brush and a peripheral brush;

the first actuator or another actuator is configured to drive the main brush or the peripheral brush;

the peripheral brush comprises a plurality of arms; and at least some of the arms comprise bristles extending from the respective arm, the bristles being secured to one another with stitching using one or more of the following techniques: stitching a line across the bristles in a direction perpendicular to the length of the bristles, stitching two lines in opposite directions diagonally across the width of the bristles, or stitching a crisscross pattern across the bristles in a direction perpendicular to the length of the bristles, wherein the one or more techniques prevents bristles from being forcibly plucked during operation of the robot.

* * * * *